United States Patent
Vutukuri et al.

(10) Patent No.: US 10,560,891 B2
(45) Date of Patent: Feb. 11, 2020

(54) MEDIUM ACCESS CONTROL IN LTE-U

(71) Applicant: BlackBerry Limited, Waterloo (CA)

(72) Inventors: Eswar Vutukuri, Hampshire (GB); Takashi Suzuki, Tokyo (JP); Nicholas William Anderson, Warmley (GB); Zhijun Cai, Herndon, VA (US)

(73) Assignee: BlackBerry Limited, Waterloo, Ontario (CA)

(*) Notice: Subject to any disclaimer, the term of this patent is extended or adjusted under 35 U.S.C. 154(b) by 30 days.

(21) Appl. No.: 14/481,808

(22) Filed: Sep. 9, 2014

(65) Prior Publication Data
US 2016/0073344 A1 Mar. 10, 2016

(51) Int. Cl.
H04W 52/02 (2009.01)
H04W 72/14 (2009.01)
H04W 76/28 (2018.01)

(52) U.S. Cl.
CPC ... *H04W 52/0216* (2013.01); *H04W 52/0229* (2013.01); *H04W 72/14* (2013.01); *H04W 76/28* (2018.02)

(58) Field of Classification Search
CPC .................................................. H04W 76/048
See application file for complete search history.

(56) References Cited

U.S. PATENT DOCUMENTS

| 8,611,240 | B2 | 12/2013 | Anderson et al. | |
| 8,848,730 | B1* | 9/2014 | Vleugels | H04W 48/14 370/443 |
| 9,801,115 | B2* | 10/2017 | Sadek | H04L 5/0073 |
| 2004/0242252 | A1* | 12/2004 | Hoeben | H04W 28/26 455/503 |
| 2011/0292851 | A1* | 12/2011 | Fong | H04L 5/001 370/311 |

(Continued)

FOREIGN PATENT DOCUMENTS

| EP | 1059773 | 12/2000 |
| JP | 2012-503349 | 2/2012 |

(Continued)

OTHER PUBLICATIONS

"3GPP TS 36.300 V12.2.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12); Jun. 2014".

(Continued)

Primary Examiner — Khaled M Kassim
Assistant Examiner — Berhanu D Belete
(74) Attorney, Agent, or Firm — Fish & Richardson P.C.

(57) ABSTRACT

In some implementations, a Medium Access Control (MAC) method for LTE in Unlicensed (LTE-U) includes transmitting at least one of a Clear to Send (CTS) message or a Request to Send (RTS) message on an LTE-U Secondary Cell (SCell) carrier. The at least one of the CTS message or the RTS message may include a duration field. The duration field may indicate a transmission time of a transmission on a packet data shared channel on the LTE-U SCell carrier. An evolved NodeB (eNB) transmits a scheduling grant for the transmission on the packet data shared channel on the LTE-U SCell carrier.

12 Claims, 18 Drawing Sheets

(56) References Cited

U.S. PATENT DOCUMENTS

| | | | |
|---|---|---|---|
| 2012/0076073 A1* | 3/2012 | Merlin | H04W 74/0816 370/328 |
| 2012/0076081 A1* | 3/2012 | Merlin | H04W 74/0816 370/329 |
| 2012/0087316 A1* | 4/2012 | Merlin | H04W 28/26 370/329 |
| 2012/0207040 A1* | 8/2012 | Comsa | H04W 72/1215 370/252 |
| 2013/0100814 A1* | 4/2013 | Kennedy | H04W 72/1215 370/236 |
| 2014/0010211 A1* | 1/2014 | Asterjadhi | H04W 74/06 370/336 |
| 2014/0036889 A1* | 2/2014 | Kim | H04L 1/1854 370/336 |
| 2014/0043979 A1* | 2/2014 | Etemad | H04W 4/70 370/237 |
| 2014/0079015 A1* | 3/2014 | Kim | H04W 28/26 370/329 |
| 2014/0112280 A1* | 4/2014 | Lee | H04W 72/04 370/329 |
| 2014/0177527 A1* | 6/2014 | Lee | H04L 5/001 370/328 |
| 2014/0185497 A1* | 7/2014 | Wolf | H04W 28/26 370/294 |
| 2014/0287769 A1* | 9/2014 | Taori | H04W 74/0808 455/450 |
| 2014/0328265 A1* | 11/2014 | Sampath | H04W 72/082 370/329 |
| 2014/0335876 A1* | 11/2014 | Ratasuk | H04W 16/14 455/450 |
| 2014/0341135 A1* | 11/2014 | Bhushan | H04L 5/1469 370/329 |
| 2014/0342745 A1* | 11/2014 | Bhushan | H04W 28/0289 455/450 |
| 2014/0362780 A1* | 12/2014 | Malladi | H04W 16/14 370/329 |
| 2015/0049708 A1* | 2/2015 | Damnjanovic | H04L 1/1812 370/329 |
| 2015/0049709 A1* | 2/2015 | Damnjanovic | H04L 5/0055 370/329 |
| 2015/0063148 A1* | 3/2015 | Sadek | H04W 74/0816 370/252 |
| 2015/0063150 A1* | 3/2015 | Sadek | H04W 24/10 370/252 |
| 2015/0063251 A1* | 3/2015 | Asterjadhi | H04W 74/04 370/329 |
| 2015/0063259 A1* | 3/2015 | Gohari | H04W 28/20 370/329 |
| 2015/0103775 A1* | 4/2015 | Zhu | H04L 1/1822 370/329 |
| 2015/0139175 A1* | 5/2015 | Ratasuk | H04L 5/0051 370/330 |
| 2015/0163805 A1* | 6/2015 | Cattoni | H04W 72/0453 370/329 |
| 2015/0188690 A1* | 7/2015 | Khoryaev | H04W 52/0251 370/280 |
| 2015/0222414 A1* | 8/2015 | Tabet | H04L 7/0016 370/350 |
| 2015/0223075 A1* | 8/2015 | Bashar | H04W 16/14 370/329 |
| 2015/0223228 A1* | 8/2015 | Rune | H04W 72/1278 370/311 |
| 2015/0312793 A1* | 10/2015 | Jeon | H04W 28/0205 370/329 |
| 2015/0358968 A1* | 12/2015 | Malladi | H04W 16/14 455/454 |
| 2015/0373741 A1* | 12/2015 | Yerramalli | H04W 74/0808 370/336 |
| 2015/0382374 A1* | 12/2015 | Bhorkar | H04W 24/00 370/330 |
| 2016/0007322 A1* | 1/2016 | Agardh | H04W 72/04 370/329 |
| 2016/0037490 A1* | 2/2016 | Pazhyannur | H04W 16/14 370/329 |
| 2016/0066195 A1* | 3/2016 | Moon | H04W 16/14 455/454 |
| 2016/0066325 A1* | 3/2016 | Kim | H04W 74/0816 370/329 |
| 2016/0262023 A1* | 9/2016 | Hiertz | H04W 74/006 |
| 2017/0142711 A1* | 5/2017 | Yi | H04W 72/0446 |
| 2017/0202019 A1* | 7/2017 | You | H04W 16/14 |
| 2017/0208627 A1* | 7/2017 | You | H04W 72/0446 |

FOREIGN PATENT DOCUMENTS

| | | | |
|---|---|---|---|
| JP | 2014-007710 | 1/2014 | |
| WO | 2011069442 | 6/2011 | |
| WO | 2013049136 | 4/2013 | |
| WO | 2013087835 | 6/2013 | |
| WO | WO-2013087835 A1 * | 6/2013 | H04W 16/14 |
| WO | WO2013/136317 | 9/2013 | |
| WO | 2013179270 | 12/2013 | |

OTHER PUBLICATIONS

Extending the benefits of LTE to unlicensed spectrum, Qualcomm, Workshop on LTE in Unlicensed Bands, Paris, France, Jan. 21-22, 2014.

"3GPP TS 36.321 V12.2.1 3rd Generation Partnership Project;Technical Specification Group Radio Access Network; Evolved Universal Terrestrial Radio Access (E-UTRA);Medium Access Control (MAC) protocol specification(Release 12); Jun. 2014".

Hidden node problem, From Wikipedia, the free encyclopedia, http://en.wikipedia.org/wiki/Hidden_node_problem; retrieved Sep. 9, 2014.

NTT Docomo, Inc, "NTT Docomo's Views on LTE Unlicensed," Workshop on LTE in Unlicensed Bands, Paris, France, Jan. 21-22, 2014, 13 pages.

Matthew Gast, "802.11 Wireless Networks: The Definitive Guide," O'Reilly, 2nd Edition, 436 pages.

IEEE Std 802.11-2012, Part 11: Wireless LAN Medium Access Control (MAC) and Physical Layer (PHY) Specifications, 2793 pages.

I.A.E.S.I., 4GCelleX, "Technical solution for LTE operation in 5GHz and its compatibility with the EC Decisions and ETSI regulations," Workshop on LTE in Unlicensed Bands, Paris, France, Jan. 21-22, 2014.

Nicholas Anderson et.al, BlackBerry IDF: 45677-ID, "Mechanisms to Support UE Power Preference Signalling," Jun. 27, 2012.

Invitation to Pay Additional Fee and Partial Search Report issued in International Application No. PCT/US2015/048337 dated Dec. 1, 2015.

Rapeepat Ratasuk et al: "License-exempt LTE deployment in heterogeneous network," IEEE, Aug. 28, 2012, pp. 246-250.

International Search Report and Written Opinion for International Application No. PCT/US2015/048837 dated Apr. 14, 2016.

Communication Pursuant to Article 94(3) EPC issued in European Application No. 15766351.9 dated Aug. 16, 2018, 8 pages.

Office Action issued in Mexican Application No. MX2017003046 dated May 7, 2019, 5 pages.

Office Action issued in Japanese Application No. 2017-513140 dated Apr. 16, 2019, 4 pages.

* cited by examiner

MEDIUM ACCESS CONTROL IN LTE-U

TECHNICAL FIELD

This disclosure relates to data transmission in communication systems and, more specifically, to Medium Access Control (MAC) for LTE in Unlicensed (LTE-U).

BACKGROUND

In a wireless communication system, such as a third generation partnership project (3GPP) long term evolution (LTE) system, the MAC protocol layer determines whether a transmission resource is available. This mechanism of the MAC protocol determining the transmission opportunity is referred to as scheduling. For a Downlink (DL) transmission, a MAC layer scheduler in an evolved Node B (eNB) may determine when one or more DL packets will be transmitted to a User Equipment (UE). The eNB may transmit a DL scheduling grant to the UE on a Physical Downlink Control Channel (PDCCH) to indicate the DL channel resource for the transmission. For an Uplink (UL) transmission, a UE may request resources for the UL transmission. An UL scheduler within the eNB's MAC layer may decide which UE may have access to the UL channel resources in any given Transmission Time Interval (TTI). The eNB may transmit an UL scheduling grant to the UE on a PDCCH to indicate the UL channel resources for the transmission.

A wireless communication system, such as an LTE system, may also use Discontinuous Reception (DRX) procedures to reduce battery power consumption of a UE in the system. For example, an eNB may configure a UE to operate in a DRX configuration mode by transmitting a DRX configuration to the UE. The DRX configuration may include one or more parameters to indicate when the UE may activate its receiver and monitor a subframe for the presence of DL or UL grants on PDCCH. In some cases, the time when the UE may activate its receiver and monitor PDCCH is referred to as a DRX active time. In some cases, the DL or UL grants are referred to as the DL or UL assignments. During other subframes, the UE may switch off its receiver to reduce power consumption. In some cases, these subframes are referred to as DRX inactive time. The DRX configuration parameters may include one or more timers. The DRX patterns and duty cycles for the DRX active time and the DRX inactive time may vary based on the data activity and the one or more timers. For example, the DRX configuration parameters may include a DRX inactivity timer, which may be set to an initial value and then restarted each time a scheduling grant for either UL or DL is received. When the DRX inactivity timer is running, e.g., during a DRX active time, the UE may actively monitor all DL subframes. When the DRX inactivity timer expires, which may indicate that there has not been any new UL or DL assignments for a defined period of time, the UE's monitoring pattern will change and the UE may monitor only a reduced number of subframes and turn off part or all of its receivers for the remaining downlink subframes to reduce its battery consumption. The eNB may use Radio Resource Control (RRC) messages to transmit the DRX configuration parameters.

DETAILED DESCRIPTION

The present disclosure is directed to Medium Access Control (MAC) in LTE in Unlicensed (LTE-U). Operators have been looking at a number of ways to address the spectrum shortage problem. Effectively using unlicensed spectrum may be a solution to this problem. For example, a variation of LTE technology may be used in unlicensed spectrum to coexist with other wireless devices, such as an 801.11 device. This technology may be referred to as LTE in Unlicensed (LTE-U) or Licensed-Assisted Access in LTE (LAA-LTE).

In LTE-U, eNBs and UEs may use Carrier Aggregation (CA) to transmit and receive data on a LTE-U carrier. In CA, two or more component carriers (CCs) may be simultaneously used to send data to or from the same UE. When a UE is configured in CA, the UE may have one RRC connection with the eNB. The eNB may configure a Primary Cell (PCell) carrier and one or more Secondary Cell (SCell) carriers for the UE. In some cases, an eNB may use cross-carrier scheduling to transmit scheduling grant to a UE. For example, an eNB may send an UL grant or a DL grant on the PDCCH of the PCell carrier to schedule an UL transmission or a DL transmission on a SCell carrier. The SCell carrier may be indicated by a carrier indicator field (CIF) in the UL grant or DL grant. In LTE-U, an eNB may configure a PCell carrier in a licensed spectrum for a UE. For example, the PCell carrier may be a LTE carrier that uses LTE spectrum owned by the operator. The eNB may configure a SCell carrier in an unlicensed spectrum for the UE. For example, the SCell carrier may be a LTE-U carrier that uses unlicensed spectrum.

Figure 1:
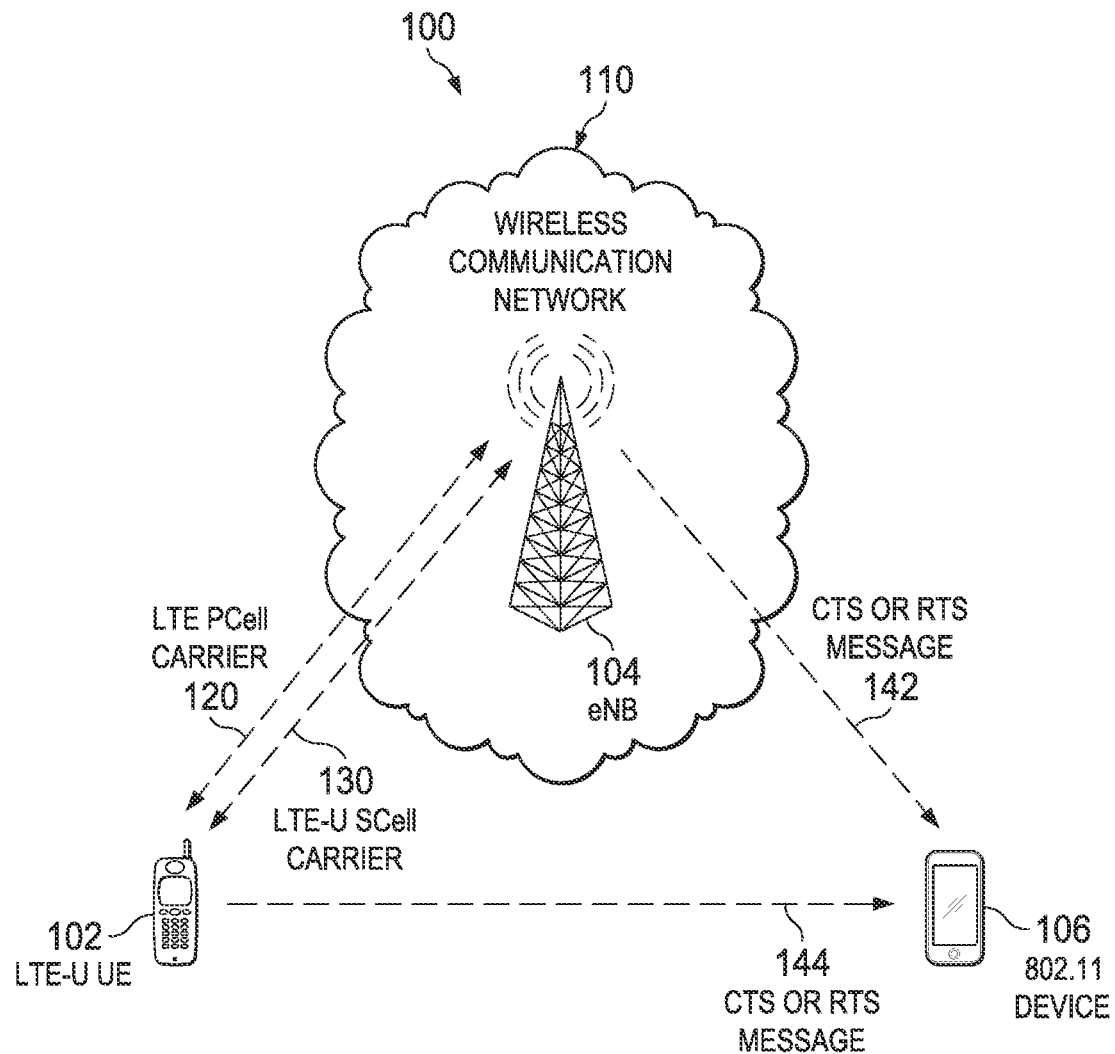
FIG. 1 is an example wireless communication system 100 that illustrates an operation in LTE-U.

FIG. 1 is an example wireless communication system 100 that illustrates an operation in LTE-U. For example, in a wireless communication system, a UE may receive a first Discontinuous Reception (DRX) configuration from an evolved NodeB (eNB). While the UE is operating in the first DRX configuration, the UE may receive, from the eNB, a DRX Configuration Switch indication that indicates a switch to a second DRX configuration. In some implementations, the DRX Configuration Switch indication may indicate a switch between two existing configurations. Alternatively or in combination, the DRX Configuration Switch indication may indicate a replacement of an existing configuration with a new configuration. The DRX Configuration Switch indication may be received after a load change in an LTE-U SCell carrier. In some implementations, the load change in the LTE-U SCell carrier may be detected based on a change in at least one of a collision rate on the LTE-U SCell carrier, a mean energy level detected on the LTE-U SCell carrier, or a mean data rate achieved over the LTE-U SCell carrier. In response to the DRX Configuration Switch indication, the UE may switch from the first DRX configuration to the second DRX configuration. Other metrics associated with the load of the unlicensed medium may also be used. For example, a "medium occupancy factor" may be derived that is indicative of a current or averaged fraction of time during which the medium is determined to be occupied. In one implementation, the determination as to whether the medium is occupied could be based on a comparison of a received signal or interference level, within at least a portion of an unlicensed band or carrier, relative to a threshold. In this case, if the received signal level exceeds the threshold, the medium may be classified as "busy", otherwise the medium is classified as "not busy". The medium occupancy factor could then be calculated based on the proportion of busy time during an observation period. It will be appreciated that other methods of determining a medium occupancy factor are also possible, including those that do not rely purely on a binary classification of the medium as busy or not-busy. In such methods, a distribution or time history of a received signal or interference level within the unlicensed band or carrier could be evaluated and a medium occupancy factor derived therefrom.

In some implementations, the DRX Configuration Switch indication may be received in a Medium Access Control (MAC) Control Element (CE). In some implementations, the DRX Configuration Switch indication may be included in a Radio Resource Control (RRC) Connection Reconfiguration message. In some implementations, the RRC Connection Reconfiguration message may include parameters associated with the second DRX configuration. In some implementations, the first and the second DRX configurations are preconfigured at the UE. In some implementations, the first and second DRX configurations are preconfigured at the UE using an RRC Connection Reconfiguration message.

In some implementations, an eNB may transmit a first DRX configuration, causing a UE to operate in a first DRX configuration mode. The eNB may determine a load change in an LTE-U SCell carrier. Based on the determining, the eNB may transmit a DRX Configuration Switch indication that indicates a switch to a second DRX configuration, causing the UE to operate in a second DRX configuration mode.

In some implementations, an eNB may transmit at least one of a Clear to Send (CTS) message or a Request to Send (RTS) message on an LTE-U SCell carrier. The at least one of the CTS message or the RTS message may include a duration field. The duration field may indicate a transmission time of a transmission on a packet data shared channel on the LTE-U SCell carrier. The eNB may transmit a scheduling grant for the transmission on the packet data shared channel on the LTE-U SCell carrier during the transmission time. In some implementations, the scheduling grant may indicate a Physical Downlink Shared Channel (PDSCH) transmission, and the eNB may transmit a PDSCH subframe during the transmission time. In some implementations, the scheduling grant may indicate a Physical Uplink Shared Channel (PUSCH) transmission by a UE, and the eNB may receive an Uplink (UL) transmission request from the UE and a PUSCH subframe during the transmission time from the UE.

In some implementations, a UE may receive, from an eNB, an UL grant that indicates a permission for a PUSCH transmission on an LTE-U SCell carrier during one or more subframes. In some implementations, the UL grant may be received on a PDCCH. In some implementations, the UL grant is received on a Long Term Evolution (LTE) Primary Cell (PCell) carrier. In some implementations, the UL grant is a semi-static UL grant configured using an RRC message. In some implementations, the UL grant is a dynamic UL grant. In some implementations, the UE may transmit at least one of a CTS message or an RTS message on the LTE-U SCell carrier. The at least one of the CTS message or the RTS message may include a duration field. The duration field may indicate a transmission time. The UE may determine whether the LTE-U SCell carrier is available for transmission during the one or more subframes. In some implementations, the UE determines whether the LTE-U SCell carrier is available for transmission based on measuring a signal level on the LTE-U SCell carrier. In some implementations, the UE determines whether the LTE-U SCell carrier is available for transmission based on measuring a signal level lower than a threshold. In some implementations, the UE determines whether the LTE-U SCell carrier is not available for transmission based on measuring a signal level higher than a threshold. If the LTE-U SCell carrier is available for transmission, the UE may transmit a PUSCH subframe on the LTE-U SCell carrier. If the LTE-U SCell carrier is not available for transmission, the UE may refrain from transmitting on the LTE-U SCell carrier. In some implementations, LTE Transmission Time Interval (TTI) bundling is used when transmitting more than one subframes consecutively in order to reduce the time to occupy the SCell carrier.

Operating the MAC in LTE-U according to methods and systems described herein may provide one or more advantages. For example, an eNB may tailor the current DRX configuration of a UE based on the load level of the LTE-U carrier. Therefore, the UE may reduce its battery consumption while meeting the latency requirement of the data service. In addition, by measuring the signal level on the LTE-U carrier before determining whether to transmit, a UE may effectively use the unlicensed spectrum when the spectrum is free, while avoiding collisions and data loss when the spectrum is busy. Furthermore, sending a CTS or an RTS may enable the UE or the eNB to reserve the radio resources in the LTE-U carrier and therefore increase the success rate of the data transmission.

At a high level, the example wireless communication system 100 includes an LTE-U UE 102, an 802.11 device 106, and a wireless communication network 110, which includes an eNB 104 that is communicably coupled with the LTE-U UE 102. In the illustrated example, the eNB 104 configures the LTE-U UE 102 in CA. The LTE-U UE 102 may transmit to or receive from the eNB 104 on an LTE PCell carrier 120. The LTE-U UE 102 may also transmit to or receive from the eNB 104 on an LTE-U SCell carrier 130. In the illustrated example, the LTE-U SCell carrier 130 operates in unlicensed spectrum.

Figure 2:
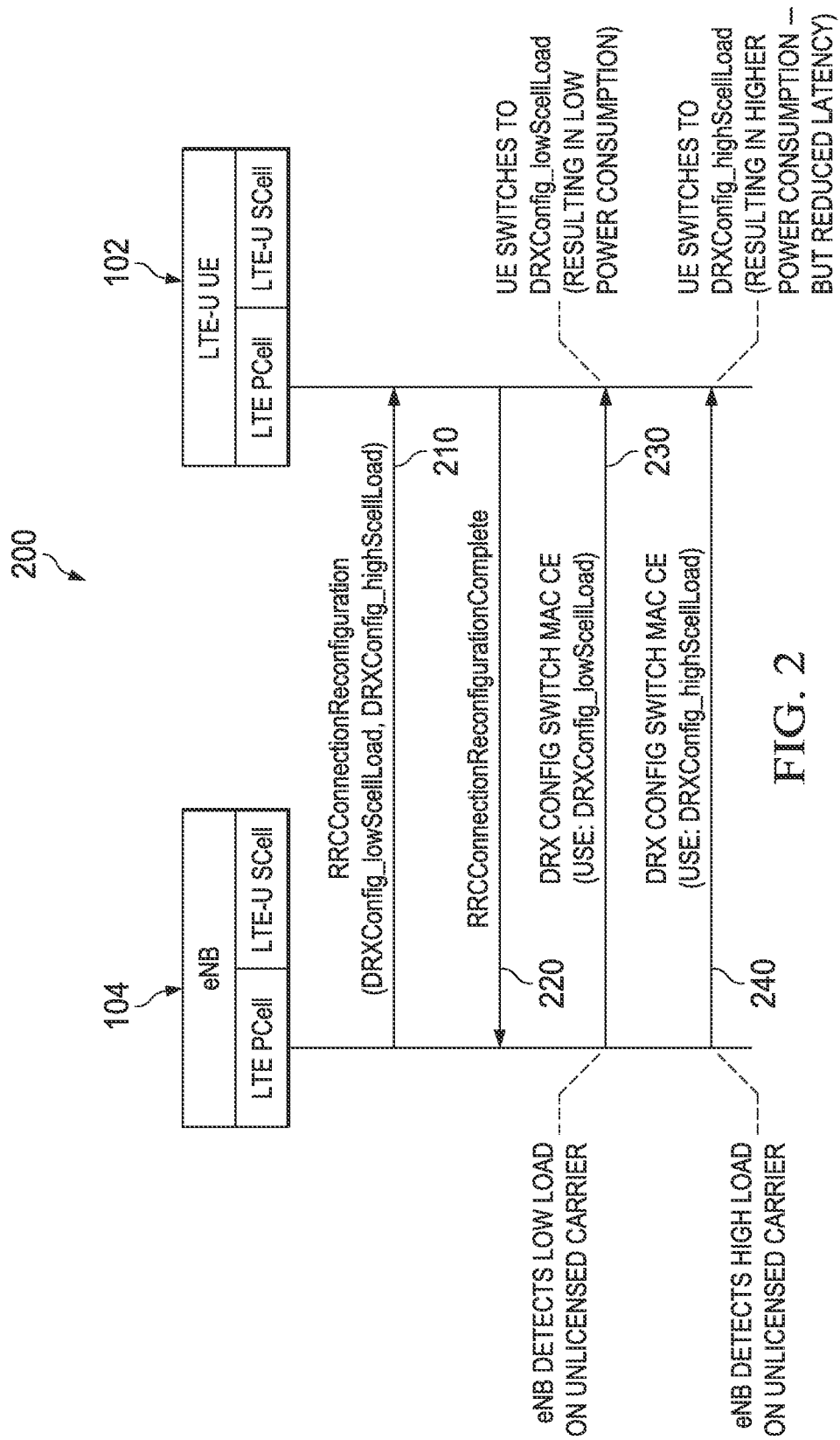
FIG. 2 is an example data flow diagram illustrating DRX configuration switching using MAC signaling.
Figure 3:
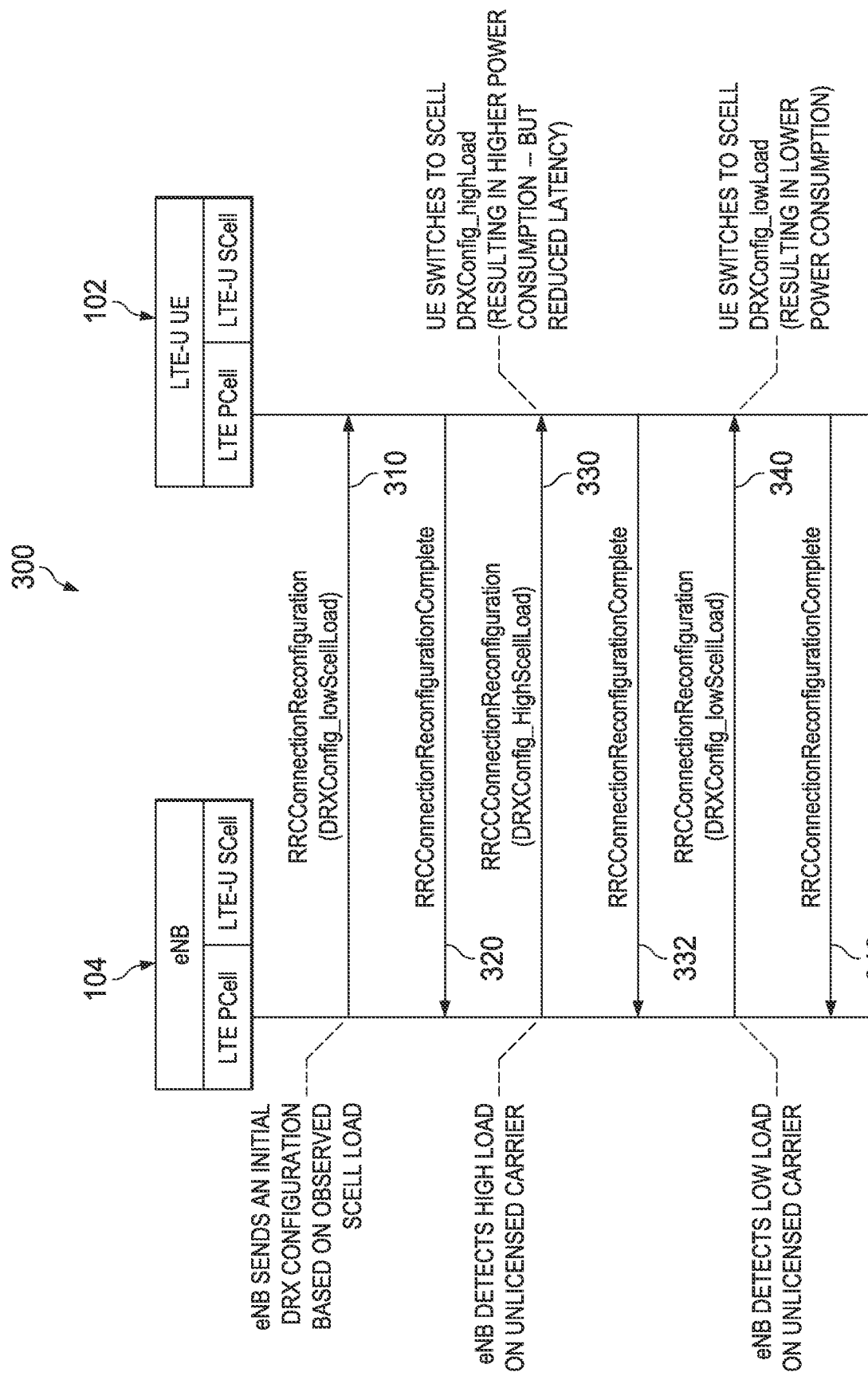
FIG. 3 is an example data flow diagram illustrating DRX configuration switching using RRC signaling.
Figure 4:
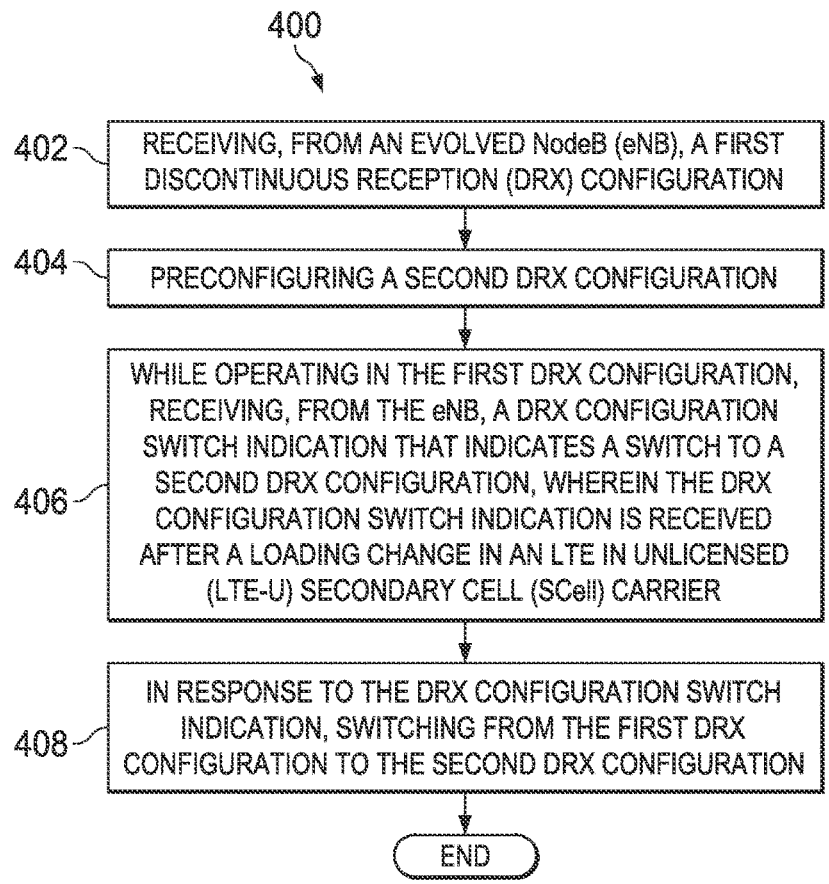
FIG. 4 is a flowchart illustrating a method for DRX configuration switching.

In the illustrated example, the LTE-U UE 102 receives a first Discontinuous Reception (DRX) configuration from the eNB 104. While the LTE-U UE 102 operates in the first DRX configuration, the LTE-U UE 102 receives a DRX Configuration Switch indication from the eNB 104 after a load change in the LTE-U SCell carrier 130. The DRX Configuration Switch indication indicates a switch to a second DRX configuration. In response to the DRX Configuration Switch indication, the LTE-U UE 102 switches from the first DRX configuration to the second DRX configuration. FIGS. 2-4 and associated descriptions provide additional details of these implementations. In some alternatives, the LTE-U UEs may receive multiple DRX configurations during the initial connection setup stage, and each DRX configuration has an index.

In some instances, the eNB 104 transmits a Clear to Send (CTS) message or a Request to Send (RTS) message 142 on the LTE-U SCell carrier 130 to the 802.11 device 106. The CTS message or the RTS message 142 includes a duration field. The duration field indicates a transmission time of a transmission on a packet data shared channel on the LTE-U SCell carrier 130. The eNB 104 transmits a scheduling grant for the transmission on the packet data shared channel on the LTE-U SCell carrier 130 during the transmission time. FIGS. 5-13 and associated descriptions provide additional details of these implementations.

In some instances, the LTE-U UE 102 receives an UL grant from the eNB 104. The UL grant indicates a permission for a PUSCH transmission on an LTE-U SCell carrier 130 during one or more subframes. In some implementations, the LTE-U UE 102 transmits a CTS or an RTS message 144 on the LTE-U SCell carrier 130 to the 802.11 device 106. The CTS or the RTS message 144 includes a duration field. The duration field indicates a transmission time. The LTE-U UE 102 determines whether the LTE-U SCell carrier 130 is available for transmission during the one or more subframes. If the LTE-U SCell carrier 130 is available for transmission, the LTE-U UE 102 transmits a PUSCH subframe on the LTE-U SCell carrier 130. If the LTE-U SCell carrier 130 is not available for transmission, the LTE-U UE 102 refrains from transmitting on the LTE-U SCell carrier 130. FIGS. 14-18 and associated descriptions provide additional details of these implementations.

Turning to a general description of the elements, a UE may be referred to as mobile electronic device, user device, mobile station, subscriber station, portable electronic device, mobile communications device, wireless modem, or wireless terminal. Examples of a UE (e.g., the LTE-U UE 102) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include wireless link over a licensed spectrum or over an unlicensed spectrum.

Other examples of a UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. A UE may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device," "user agent," "UA," "user device," and "mobile device" can be used synonymously herein.

The wireless communication network 110 may include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE_Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one eNB 104. An eNB 104 may be a radio base station that may control all or at least some radio related functions in a fixed part of the system. The eNB 104 may provide radio interface within their coverage area or a cell for the LTE-U UE 102 to communicate. The eNB 104 may be distributed throughout the cellular network to provide a wide area of coverage. The eNB 104 directly communicates to one or a plurality of UEs, other base stations, and one or more core network nodes.

An 802.11 device may be any device that operates in unlicensed spectrum. Examples of an 802.11 device (e.g., the 802.11 device 106) may include a cellular phone, personal data assistant (PDA), smart phone, laptop, tablet personal computer (PC), pager, portable computer, portable gaming device, wearable electronic device, access point, access terminal, or other mobile communications device having components for communicating voice or data over unlicensed spectrum. Examples of unlicensed spectrum may include spectrum that uses IEEE 802.11 wireless local area network technology.

While described in terms of FIG. 1, the present disclosure is not limited to such an environment. In general, wireless communication systems may be described as cellular networks made up of a number of radio cells, or cells that are each served by a base station or other fixed transceiver. The cells are used to cover different areas in order to provide radio coverage over an area. Example wireless communication systems include Global System for Mobile Communication (GSM) protocols, Universal Mobile Telecommunications System (UMTS), 3GPP Long Term Evolution (LTE), and others. In addition to wireless communication systems, wireless broadband communication systems may also be suitable for the various implementations described in the present disclosure. Example wireless broadband communication system includes IEEE 802.11 wireless local area network, IEEE 802.16 WiMAX network, and etc.

FIG. 2 is an example data flow diagram 200 illustrating DRX configuration switching using MAC signaling. In the illustrated example, the eNB 104 communicates with the LTE-U UE 102 to adaptively switch DRX configurations. In the illustrated example, the eNB 104 schedules transmissions on the LTE-U SCell carrier using PDCCH on the downlink in the LTE-U SCell carrier. The LTE-U UE 102 monitors the PDCCH on the LTE-U SCell carrier for scheduling grants. In the illustrated example, the LTE-U UE 102 is configured to operate in DRX mode. The LTE-U UE 102 therefore monitors the PDCCH on the LTE-U SCell carrier during DRX active time. In some implementations, the eNB 104 determines whether the LTE-U SCell carrier is busy. In such a case, the eNB 104 may transmit DL packet or scheduling grant when the LTE-U SCell carrier is not busy.

At step 210, the eNB 104 transmits an RRC message to the LTE-U UE 102. In the illustrated example, the RRC message is an RRCConnectionReconfiguration message. The RRC message includes a DRX configuration for high load and a DRX configuration for low load. In some alternatives, the RRC messages may include more than two DRX configurations. A DRX configuration for high load includes parameters that may keep a UE awake (i.e. listening to the PDCCH in downlink) more often. For example, a DRX configuration for high load may include shorter DRX cycles, longer inactivity timers, longer ON duration timers, and etc. A DRX configuration for low load includes parameters that may keep a UE asleep more often, and thereby reduce the UE's power consumption. For example, a DRX configuration for low load may include longer DRX cycles, shorter inactivity timers, longer ON duration timers, and etc.

At step 220, the LTE-U UE 102 sends an RRCConnectionReconfigurationComplete to the eNB 104 to indicate that the RRCConnectionReconfiguration message has been successfully received. In the illustrated example, the LTE-U UE 102 enters into DRX mode using the DRX configuration for high load.

At step 230, the eNB 104 detects low load on the unlicensed spectrum, i.e., the LTE-U SCell carrier. The eNB 104 may determine the load on the LTE-U SCell carrier based on one or more factors. These factors may include collision rates on the LTE-U SCell carrier, mean energy levels detected on the LTE-U SCell carrier, mean data rates achieved over the LTE-U SCell carrier, and medium occupancy factors. When the load on the LTE-U SCell carrier is low, the probability of getting access through the LTE-U SCell carrier is high. Thus, the latency requirement of the data traffic can be satisfied by using the DRX configuration for low load. The eNB 104 therefore sends a DRX Configuration Switch indication to the LTE-U UE 102. In some implementations, the DRX Configuration Switch indication may be transmitted in a MAC Control Element (CE). The LTE-U UE 102 receives the DRX Configuration Switch indication and switches from the DRX configuration for high load to the DRX configuration for low load.

At step 240, the eNB 104 detects high load on the LTE-U SCell carrier. In such a case, the probability of getting access through the LTE-U SCell carrier is low. Thus, the latency of the downlink traffic may be high in this scenario because of the unavailability of the LTE-U SCell carrier. The eNB 104 therefore sends a DRX Configuration Switch indication to the LTE-U UE 102. The LTE-U UE 102 receives the DRX Configuration Switch indication and switches from the DRX configuration for low load to the DRX configuration for high load.

In some implementations, the eNB 104 may configure more than two DRX configurations for the LTE-U UE 102. The eNB 104 therefore may use DRX Configuration Switch indication to instruct the LTE-U UE 102 to switch to any of the preconfigured DRX configurations. Following is an example portion of 3GPP TS 36.321 specification that may support switching DRX configurations using MAC CE. In this example, 8 different DRX configurations can be preconfigured and the MAC CE based signaling is used to switch between these configurations.

TABLE 6.2.1-1

| Values of LCID for DL-SCH | |
|---|---|
| Index | LCID values |
| 00000 | CCCH |
| 00001-01010 | Identity of the logical channel |
| 01011-11000 | Reserved |
| 11001 | DRX Config Switch |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

6.1.3.10 DRX Config Switch MAC Control Element

The DRX Config Switch MAC control element (CE) is identified by a MAC PDU subheader with LCID as specified in table 6.2.1-1. It has a fixed size and consists of a single octet defined as follows:

R: reserved bit, set to "0";

DRX Config Switch: this field indicates the index of DRX preconfigurations. The length of the field is 3 bits, identifying 8 different DRX preconfigurations in the UE. Value 0 identifies DRX preconfiguration 0, value 1 identifies DRX preconfiguration 1, and so on.

TABLE 6.2.1-2

| DRX Config Switch MAC control element |
|---|
| \| R \| R \| R \| R \| R \| DRX Config Switch \|   Oct 1 |

FIG. 3 is an example data flow diagram 300 illustrating DRX configuration switching using RRC signaling. In the illustrated example, the eNB 104 communicates with the LTE-U UE 102 to adaptively switch DRX configurations. In the illustrated example, the eNB 104 schedules transmissions on the LTE-U SCell carrier using PDCCH on the downlink in LTE-U SCell carrier. As discussed above, the LTE-U UE 102 is configured to operate in DRX mode and therefore monitors the PDCCH on the LTE-U SCell carrier during DRX active time.

At step 310, the eNB 104 determines that the load on the LTE-U SCell carrier is low. The eNB 104 transmits an RRC message to the LTE-U UE 102. In the illustrated example, the RRC message is an RRCConnectionReconfiguration message. The RRC message includes a DRX configuration for low load. In some implementations, the eNB 104 may preconfigure more than one DRX configurations for the LTE-U UE 102.

At step 320, the LTE-U UE 102 sends an RRCConnectionReconfigurationComplete to the eNB 104 to indicate that the RRCConnectionReconfiguration message has been successfully received. The LTE-U UE 102 enters into DRX mode using the DRX configuration for low load.

At step 330, the eNB 104 detects high load on the LTE-U SCell carrier. The eNB 104 therefore sends a DRX Configuration Switch indication to the LTE-U UE 102. In some implementations, the DRX Configuration Switch indication may be transmitted in an RRC message. In the illustrated example, the RRC message is an RRCConnectionReconfiguration message. In some implementations, the RRC message may include parameters associated with the DRX configuration for high load. The LTE-U UE 102 receives the DRX Configuration Switch indication and switches from the DRX configuration for low load to the DRX configuration for high load. At step 332, the LTE-U UE 102 sends an RRCConnectionReconfigurationComplete to the eNB 104.

At step 340, the eNB 104 detects low load on the LTE-U SCell carrier. The eNB 104 therefore sends a DRX Configuration Switch indication to the LTE-U UE 102. In some implementations, the DRX Configuration Switch may be transmitted in an RRC message. In the illustrated example, the RRC message is an RRCConnectionReconfiguration message. The LTE-U UE 102 receives the DRX Configuration Switch indication and switches from the DRX configuration for high load to the DRX configuration for low load. At step 342, the LTE-U UE 102 sends an RRCConnectionReconfigurationComplete to the eNB 104. In some alternative, when multiple DRX configurations are configured, the DRX Configuration Switch indication may include the index of the intended DRX configuration.

FIG. 4 is a flowchart 400 illustrating a method for DRX configuration switching. The flowchart begins at step 402 where a UE receives a first Discontinuous Reception (DRX) configuration from an evolved NodeB (eNB). In some implementations, at step 404, the eNB preconfigures the second DRX configurations for the UE.

At step 406, while the UE is operating in the first DRX configuration, the UE receives, from the eNB, a DRX Configuration Switch indication that indicates a switch to a second DRX configuration. The DRX configuration switch indication is received when certain conditions occur, for example, after a load change in an LTE-U SCell carrier. In some implementations, the load change in the LTE-U SCell carrier may be detected by the eNB based on a change in at least one of a collision rate on the LTE-U SCell carrier, a mean energy level detected on the LTE-U SCell carrier, a mean data rate achieved over the LTE-U SCell carrier, or a medium occupancy factor. In some implementations, the DRX Configuration Switch indication may be received in a Medium Access Control (MAC) Control Element (CE). In some implementations, the DRX Configuration Switch indication may be included in a Radio Resource Control (RRC) Connection Reconfiguration message. In some implementations, the RRC Connection Reconfiguration message may also include parameters associated with the second DRX configuration. At step 408, in response to the DRX Configuration Switch indication, the UE switches from the first DRX configuration to the second DRX configuration.

Figure 5:
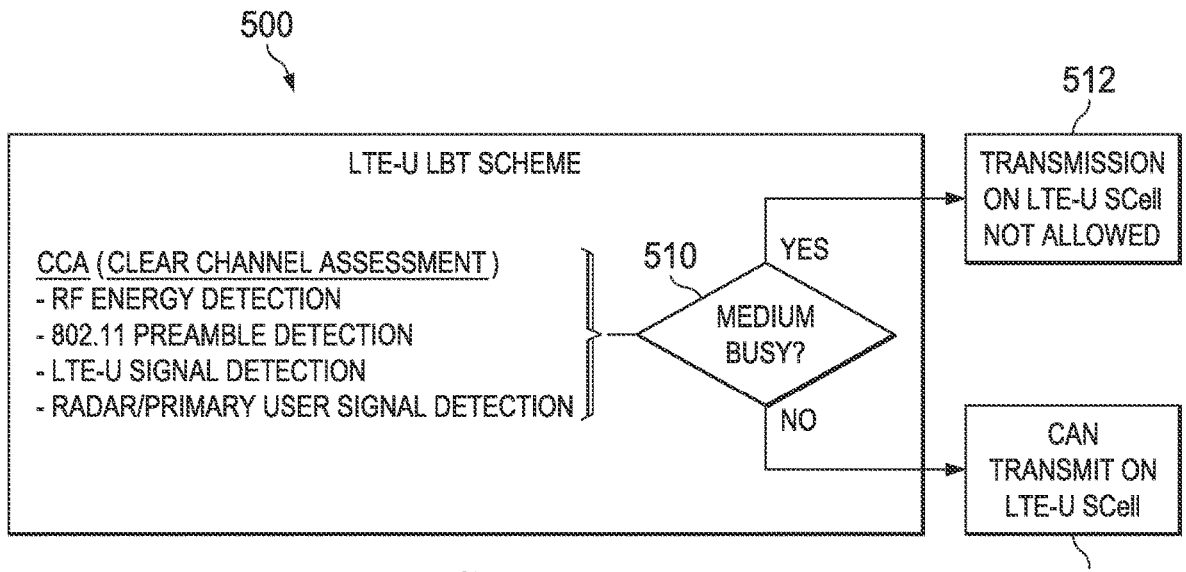
FIG. 5 is an example flowchart illustrating a Listen Before Talk (LBT) scheme for LTE-U.

FIG. 5 is an example flowchart 500 illustrating a Listen Before Talk (LBT) scheme for LTE-U. The LBT scheme may be implemented by an LBT module in different devices, e.g., the eNB 104 or the LTE-U UE 102. The flowchart 500 begins at step 510 where a Clear Channel Assessment (CCA) is made to determine whether the medium is busy. For example, the eNB 104 may determine whether the LTE-U SCell carrier is busy before transmitting in downlink. The LTE-U UE 102 may also determine whether the LTE-U SCell carrier is busy before transmitting in the uplink. In some implementations, the LBT module may listen to the LTE-U SCell carrier for its availability. In order to determine if the medium is busy or not, the LBT module may detect transmissions on the LTE-U SCell carrier using a number of methods. For example, the LBT module may detect RF energy on the carrier, 802.11 preamble transmission on the carrier, LTE-U signal transmitted on the carrier, or RADAR/Primary user signal transmitted on the carrier.

If the medium is busy, at step 512, the LBT module prevents the device from transmitting on the LTE-U SCell carrier. In some implementations, if a transmission on the LTE-U SCell carrier is detected, the LBT module may wait for an Inter Frame Spacing (IFS) period. In some implementations, multiple IFSs may be defined. For example, a Short IFS (SIFS) may be used by higher priority transmissions such as Request to Send (RTS) or Clear to Send (CTS)/Acknowledgement (ACK) transmissions. These transmissions can occur after the SIFS has elapsed. For other transmissions, the carrier may be accessed on a contention basis after a Distributed Coordination Function (DCF) IFS (DIFS) has expired. An SIFS may be on the order of 10 μs and a DIFS may be on the order of 50 μs. The values of IFSs may vary depending on the technologies used in the unlicensed spectrum. In addition, a Point Coordination Function Interframe Space (PIFS) may be defined. The value of PIFS is between DIFS and SIFS and therefore provides a slightly higher priority for channel access compared to a device using DIFS. In some implementations, after an IFS period, e.g., a DIFS period, the LBT module may wait for an additional Backoff period before transmitting on the carrier. A randomly drawn time delay parameter may be defined for the Backoff period. The Backoff period may be decremented after every interval that the channel is quiet for a period DIFS. In some implementations, a contention window (CWindow) timer is used to prevent a device that has just completed an atomic frame transfer operation from accessing the carrier again too quickly, e.g., before other devices have had a chance to access the carrier.

If the medium is not busy, then at step 514, the LBT module instructs the device to transmit on the LTE-U SCell carrier. The following table illustrates an example of the interaction between the LBT scheme and the MAC scheduling decisions.

TABLE 1

Interaction between LTE-U LBT scheme and the MAC scheduling decisions

| | | LTE-U LBT scheme output | |
|---|---|---|---|
| | | Medium busy | Medium not busy |
| Scheduling decision | Grant | No transmission | transmission allowed |
| | No Grant | No transmission | No transmission |

Figure 6:
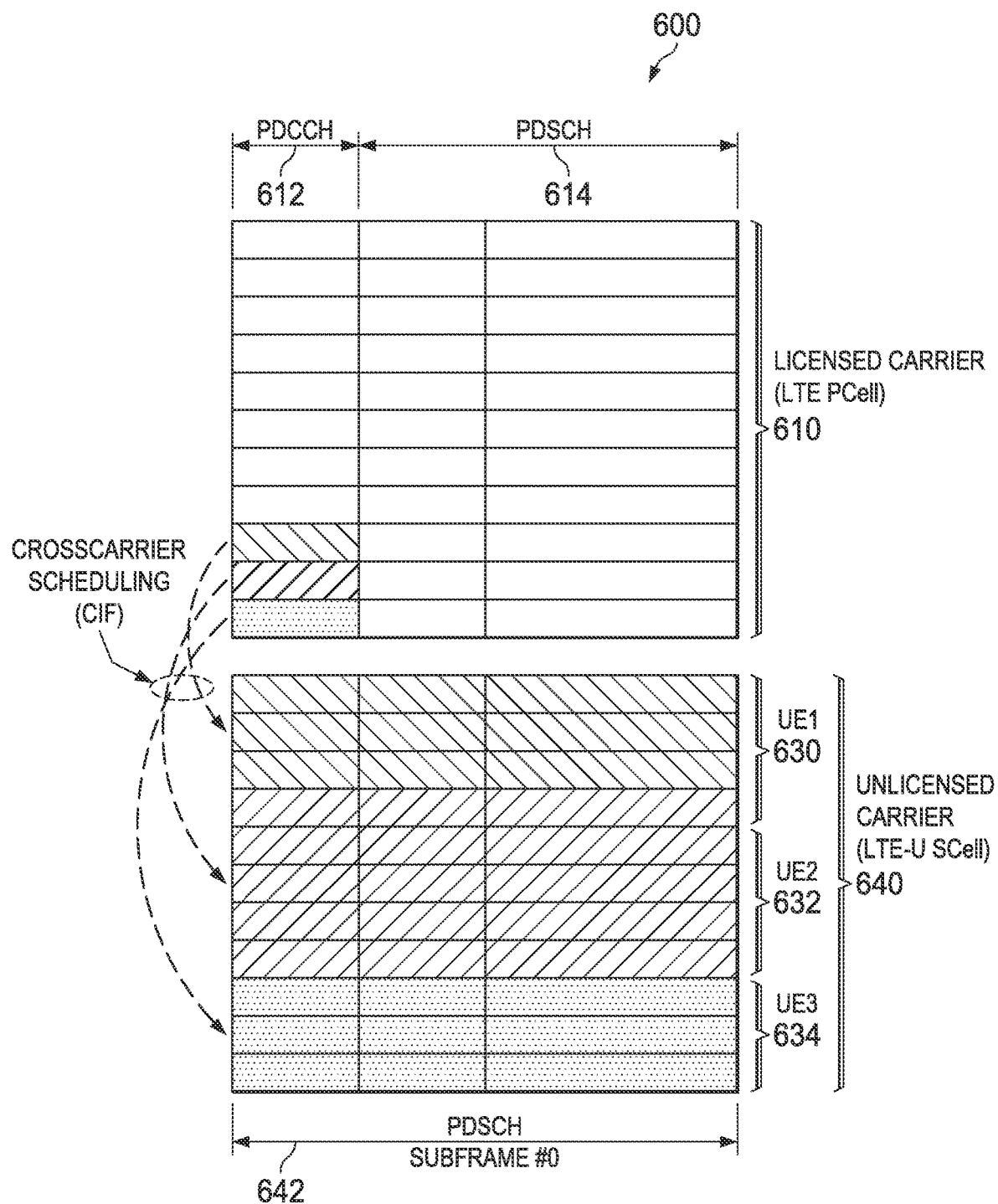
FIG. 6 is a schematic illustrating an example cross-carrier scheduling method by an eNB.

FIG. 6 is a schematic 600 illustrating an example cross-carrier scheduling method by an eNB. The schematic 600 includes an LTE PCell carrier 610 and an LTE-U SCell carrier 640. The LTE PCell carrier 610 includes a PDCCH 612 and a PDSCH 614. The LTE-U SCell carrier 640 includes a PDSCH 642. A UE1 630, a UE2 632, and a UE-3

634 are LTE-U UEs that operate in both the LTE PCell carrier 610 and the LTE-U SCell carrier 640. In the illustrated example, cross-scheduling is used and therefore the UE1 630, the UE2 632, and the UE3 634 monitor the PDCCH 612 on the LTE PCell carrier 610 for scheduling grants of the LTE-U SCell carrier 640. If a UE operates in DRX mode, then the eNB may transmit scheduling grants when the UE is in a DRX inactive time on the LTE PCell carrier.

Figure 7:
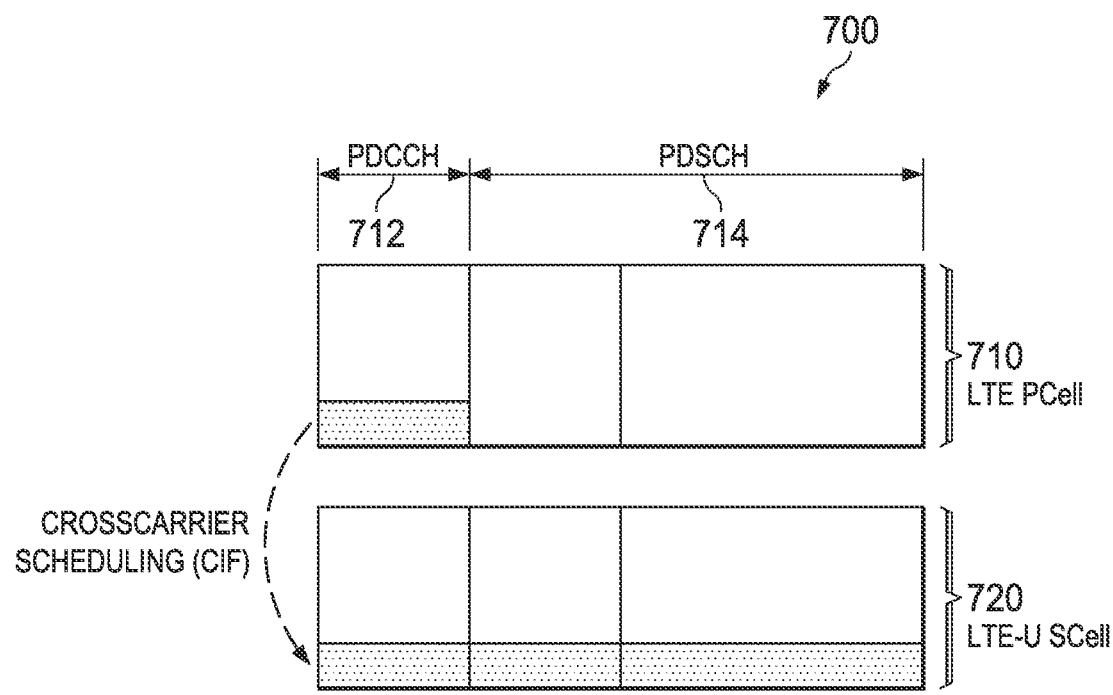
FIG. 7 is a schematic illustrating an example cross-scheduling method for a UE.

FIG. 7 is a schematic 700 illustrating an example cross-scheduling method for a UE. The schematic 700 includes an LTE PCell carrier 710 and an LTE-U SCell carrier 720. The LTE PCell carrier 710 includes a PDCCH 712 and a PDSCH 714. In the illustrated example, a UE monitors the PDCCH 712 on the LTE PCell carrier 710 for scheduling grants of the LTE-U SCell carrier 720.

Figure 8:
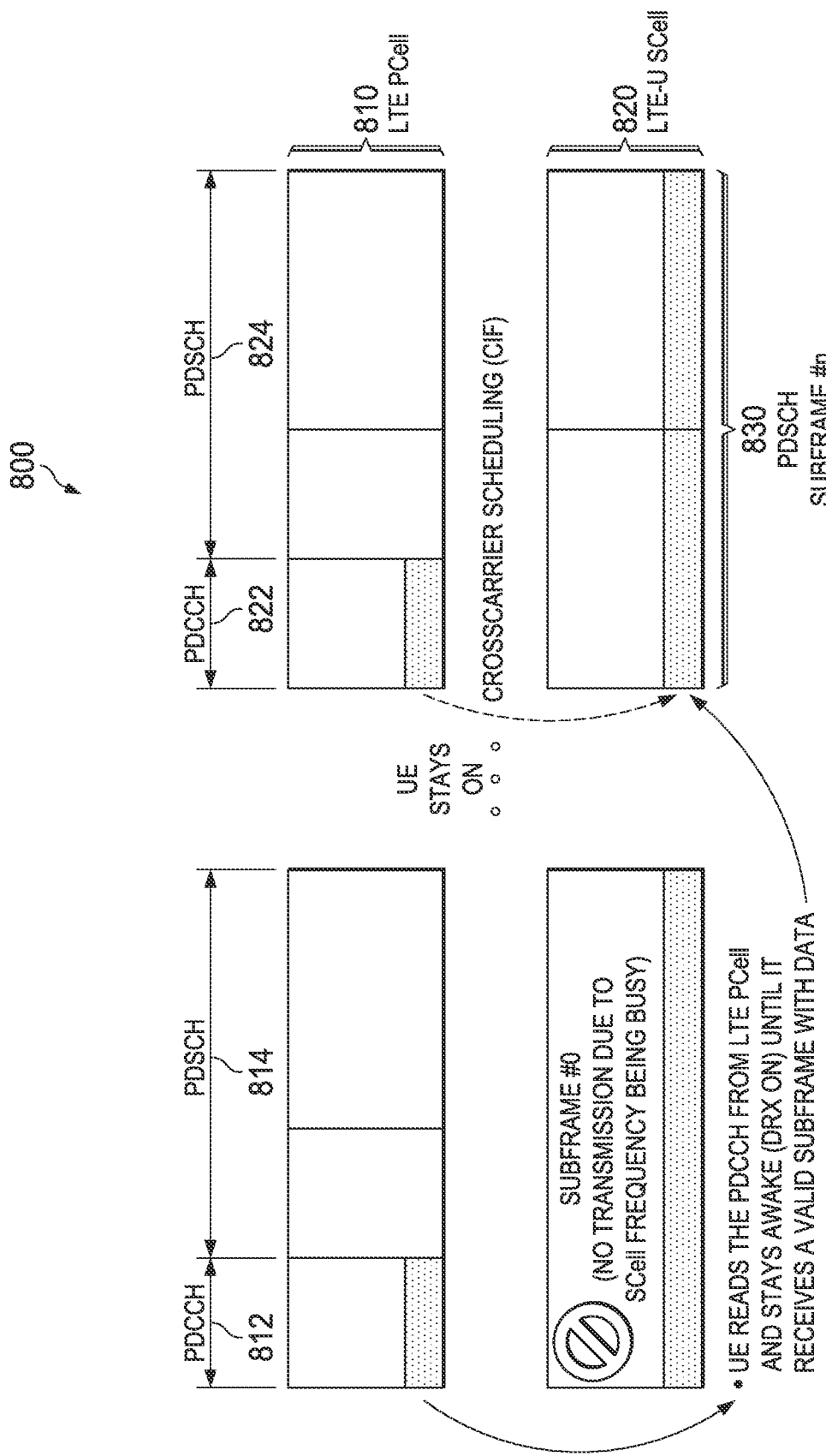
FIG. 8 is a schematic illustrating an example method for handling collision on a LTE-U Secondary Cell (SCell) carrier.

FIG. 8 is a schematic 800 illustrating an example method for handling collision on the LTE-U SCell carrier. The schematic 800 includes an LTE PCell carrier 810 and an LTE-U SCell carrier 820. The LTE PCell carrier 810 includes a PDCCH 812 and a PDSCH 814 at subframe #0. The LTE PCell carrier 810 also includes a PDCCH 822 and a PDSCH 824 at subframe #n. The LTE-U SCell carrier 820 includes a PDSCH 830 at subframe #n. Because the LTE PCell carrier 810 operates in licensed spectrum, the eNB may not use the LBT scheme to transmit scheduling grants or DL data on the LTE PCell carrier 810. On the other hand, the eNB may use the LBT scheme to transmit on the LTE-U SCell carrier 820.

In the illustrated example, the eNB makes a scheduling decision to transmit on both the LTE PCell carrier 810 and the LTE-U SCell carrier 820 at subframe #0. The eNB then determines that the LTE-U SCell carrier 820 is not available based on the LBT scheme. In such a case, the eNB may transmit on the LTE PCell carrier 810, which includes both scheduling grants on the PDCCH 812 and DL data on the PDSCH 814. The UE may therefore receive a cross-carrier downlink scheduling grant for the LTE-U SCell carrier 820 but no DL transmission on the LTE-U SCell carrier 820 at subframe #0. The UE may determine that there is no DL transmission on the LTE-U SCell carrier 820 at subframe #0 by determining that transmission addressed to the UE's CRNTI was not received on the LTE-U SCell carrier 820. In the illustrated example, the UE may continue to monitor the LTE-U SCell carrier 820 for downlink subframes until a subframe addressed to the UE is received on the LTE-U SCell carrier 820. The UE may also send an HARQ feedback, e.g., an HARQ NACK, to the eNB on the LTE PCell UL to indicate that the UE has received the scheduling grant in the subframe #0. The UE may continue to monitor DL transmissions after the DRX inactivity timer has expired. For example, the UE may start or restart the DRX related timers such as inactivity timer upon receiving a cross-carrier scheduled grant for the LTE-U SCell carrier 820 and continue listening to the LTE-U SCell carrier 820 if at least one of the following conditions holds true: 1) the DRX timers indicate that the UE is in a DRX active time, or 2) a downlink frame addressed to the UE has not yet been received after the latest PDCCH grant on the LTE PCell carrier 810. At subframe #n, when the eNB detects that the LTE-U SCell carrier 820 is free, the eNB may send another scheduling grant on the PDCCH 822 to indicate a corresponding DL data transmission on the PDSCH 830 of the LTE-U SCell carrier 820. Following is an example portion of 3GPP TS 36.321 specification that may support the collision handling method described above.

Figure 9:
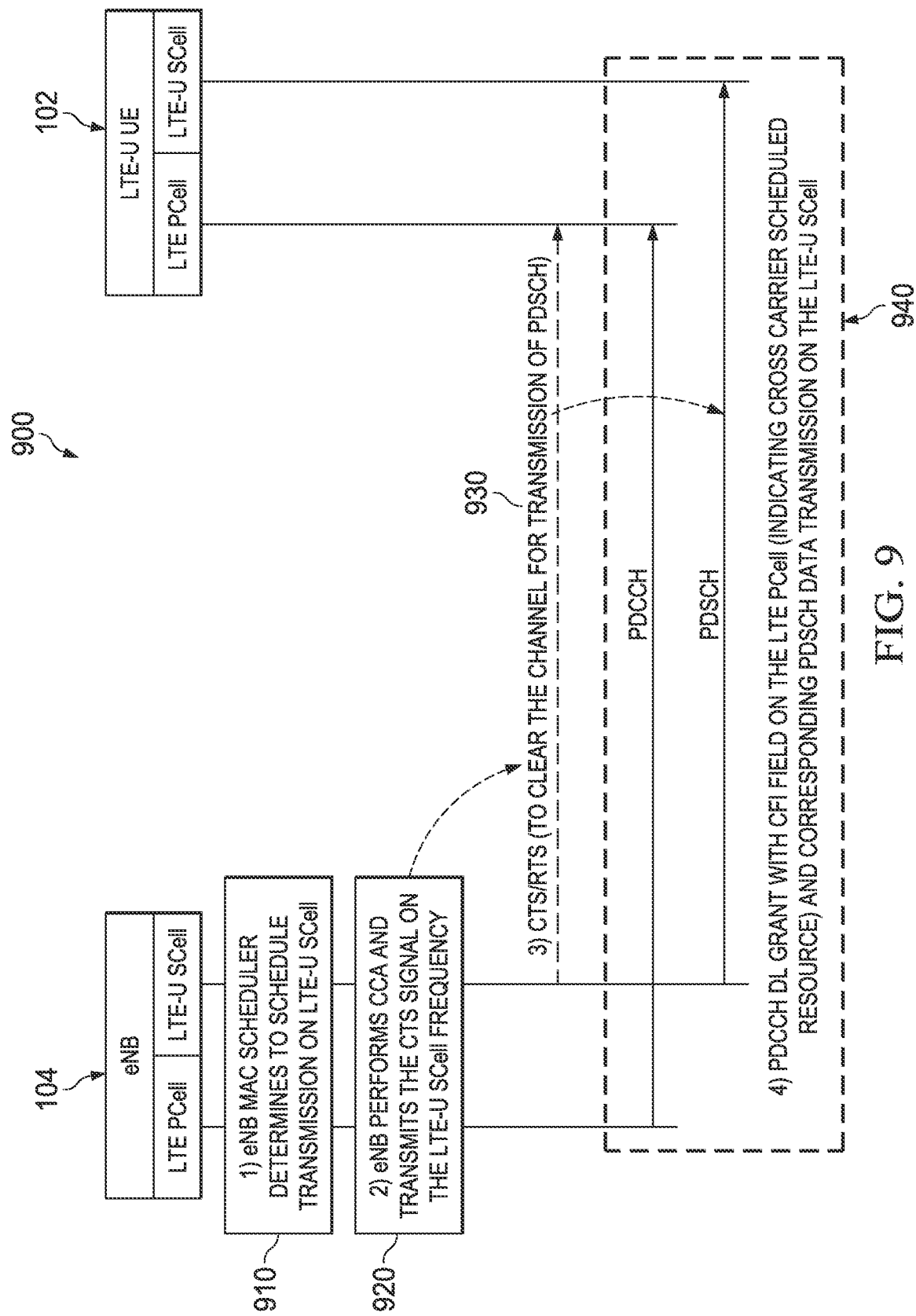
FIG. 9 is an example data flow diagram illustrating a channel clearing method by an eNB for DL transmission.

When a DRX cycle is configured, the Active Time includes the time while:
  onDurationTimer or drx-InactivityTimer or drx-RetransmissionTimer or mac-ContentionResolutionTimer (as described in subclause 5.1.5) is running; or
  a Scheduling Request is sent on PUCCH and is pending (as described in subclause 5.4.4);
or
  an uplink grant for a pending HARQ retransmission can occur and there is data in the corresponding HARQ buffer; or
  a PDCCH indicating a new transmission addressed to the C-RNTI of the UE has not been received after successful reception of a Random Access Response for the preamble not selected by the UE (as described in subclause 5.1.4); or
  a PDCCH indicating a new transmission addressed to the C-RNTI of the UE has been received indicating a cross-carrier scheduled downlink subframe on an unlicensed carrier and the corresponding transmission on PDSCH of the unlicensed carrier has not yet been received FIG. 9 is an example data flow diagram 900 illustrating a channel clearing method by an eNB for downlink transmission. In the illustrated example, the eNB 104 communicates with the LTE-U UE 102 on both the LTE PCell carrier and the LTE-U SCell carrier. At step 910, the MAC scheduler in the eNB 104 schedules a transmission on the LTE-U SCell carrier. At step 920, the eNB 104 performs CCA and sends either an RTS message or a CTS message on the LTE-U SCell carrier prior to transmission of a subframe on the LTE-U SCell carrier. The RTS message or the CTS message may include a duration field. The duration field may indicate a time period for which the LTE-U SCell carrier is going to be occupied for data transmission. Other devices that operate in the LTE-U SCell carrier may receive the RTS or the CTS and update the Network Allocation Vector (NAV). The NAV field then implicitly indicates to the other devices that the LTE-U SCell carrier is likely to be busy during the period of time as indicated by the duration field.

At step 930, the CTS or RTS messages are transmitted to clear the channel on the LTE-U SCell carrier. In some implementations, a transmitter, e.g., the eNB 104, may include a destination address (RA) in the RTS message and sends the RTS. On receiving the RTS, the receiver (identified by the RA in the RTS message) may transmit a CTS message and sends the CTS back to the transmitter. Since both the RTS and CTS messages have the same impact of muting the listening devices for the time period as indicated by the duration field, devices near the transmitter and receiver may refrain from transmitting during the period. In some implementations, the eNB times the transmission of the RTS or CTS message such that the subsequent scheduled transmission on LTE-U SCell carrier is kept clear of interference.

At step 940, during the transmission time indicated by the duration field of the CTS or RTS message, the eNB 104 transmits a scheduling grant of the LTE-U SCell carrier on the PDCCH of the LTE PCell carrier to the LTE-U UE 102. The eNB 104 also transmits DL data on the LTE SCell carrier to the LTE-U UE 102.

Figure 10:
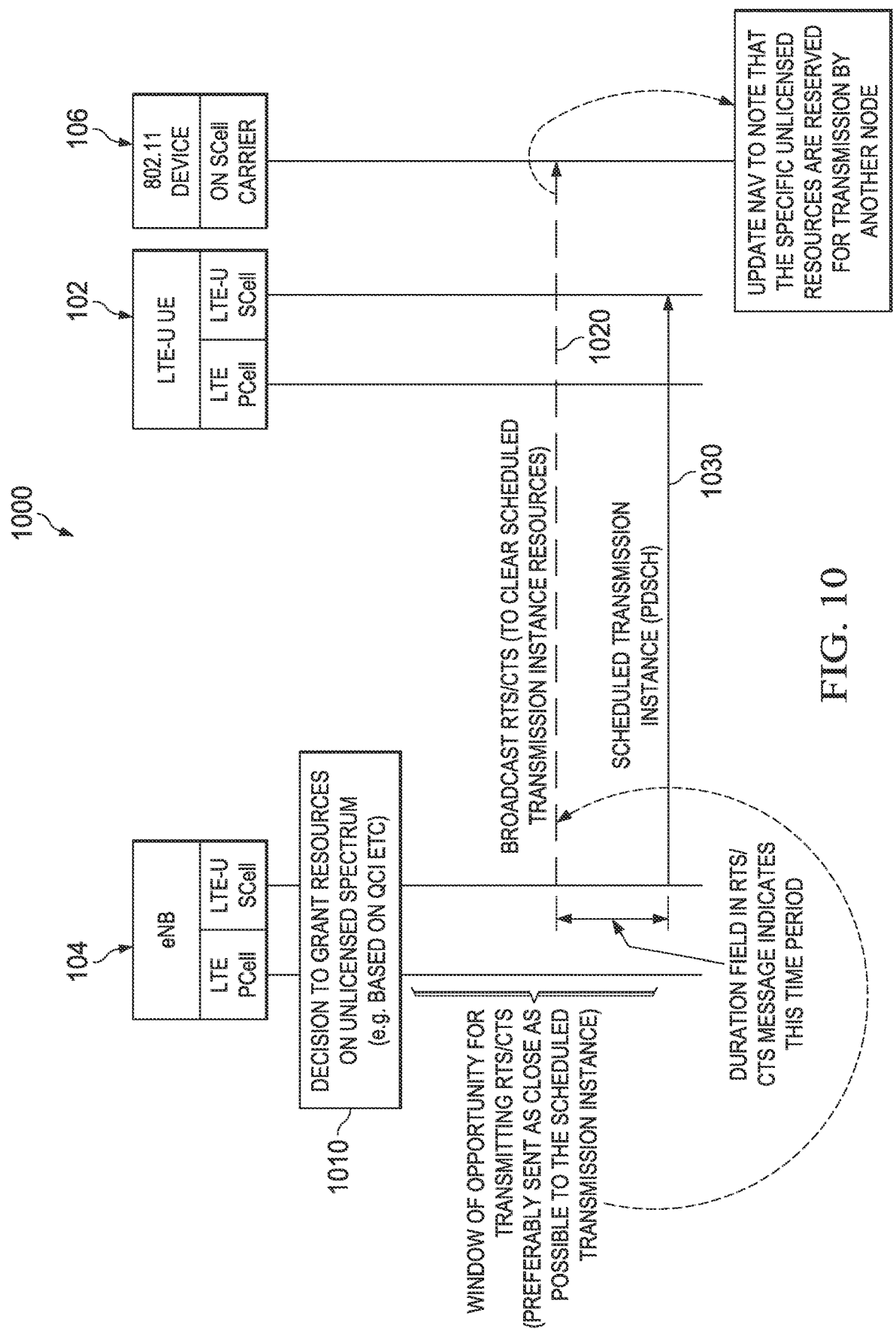
FIG. 10 is an example data flow diagram illustrating a timing relationship for clearing the channel on DL transmission by an eNB.

FIG. 10 is an example data flow diagram 1000 illustrating a timing relationship for clearing the channel on downlink transmission by an eNB. In the illustrated example, the eNB 104 communicates with the LTE-U UE 102 on both the LTE PCell carrier and the LTE-U SCell carrier. The eNB 104 also sends RTS/CTS to the 802.11 device 106 on the LTE-U SCell carrier. At step 1010, the eNB 104 determines to grant DL resources on the LTE-U SCell carrier. At step 1020, the eNB 104 broadcasts an RTS/CTS message to clear the LTE-U SCell carrier at the scheduled transmission time. As shown in the illustrated example, the window of opportunity for transmission of the RTS or CTS message starts after the eNB 104 makes the scheduling decision on the LTE-U SCell carrier. In some implementations, the eNB 104 may send the RTS or CTS message close in time to the actual PDSCH transmission. This approach may keep the LTE-U SCell carrier busy while setting a smaller value in the duration field. In some implementations, the RTS or CTS message may be addressed to a pseudo MAC address or to a MAC address associated with the eNB 104 itself. Upon receiving the RTS/CTS message, the 802.11 device 106 may update the NAV to note that the LTE-U SCell carrier is reserved. Other devices operating in the LTE-U SCell carrier, e.g., any other LTE-U eNBs or Wi-Fi devices, may also read the RTS or CTS message and update the NAV. In order to perform the initial transmission and subsequent retransmissions within the short duration, multiple redundancy versions of a transport block may be consecutively transmitted in consecutive TTIs, similar to TTI bundling in uplink direction. Downlink TTI bundling may be indicated by PDCCH.

At step 1030, the eNB 104 may transmit on the LTE-U SCell carrier to the LTE-U UE 102 as scheduled. Following is an example portion of 3GPP TS 36.212 specification that may support the channel clearing method described above.

4.2 Downlink

Table 4.2-1 specifies the mapping of the downlink transport channels to their corresponding physical channels. Table 4.2-2 specifies the mapping of the downlink control channel information to its corresponding physical channel.

TABLE 4.2-1

| TrCH (Transport Channel) | Physical Channel |
| --- | --- |
| DL-SCH (Downlink shared channel) | PDSCH |
| BCH (Broadcast Channel) | PBCH (Physical Broadcast Channel) |
| PCH (Paging Channel) | PDSCH |
| MCH (Multicast Channel) | PMCH (Physical Multicast Channel) |

TABLE 4.2-2

| Control information | Physical Channel |
| --- | --- |
| CFI (control format indicator) | PCFICH (Physical Control Format Indicator Channel) |
| HI (HARQ indicator) | PHICH (Physical HARQ indicator Channel) |
| DCI (Downlink control indicator) | PDCCH, EPDCCH (Enhanced PDCCH) |

5 Channel Coding, Multiplexing and Interleaving
. . .
5.3.3.1.2 Format 1

DCI format 1 is used for the scheduling of one PDSCH codeword in one cell.

The following information is transmitted by means of the DCI format 1:

Carrier indicator—0 or 3 bits. This field is present according to the definitions in [3].
When the carrier indicator corresponds to a carrier in unlicensed spectrum, the eNB shall monitor the availability of the carrier and transmit a CTS message [See IEEE Std 802.11™-2012, Part 11] prior to transmission of the PDSCH on the carrier to ensure that this carrier is available for the transmission of the PDSCH codeword. The timing of the transmission is left to eNB implementation but should be transmitted close in time to the transmission instance of the PDSCH but prior to the PDSCH transmission and the indicated duration in the CTS message shall cover the period of the PDSCH transmission.

Figure 11:
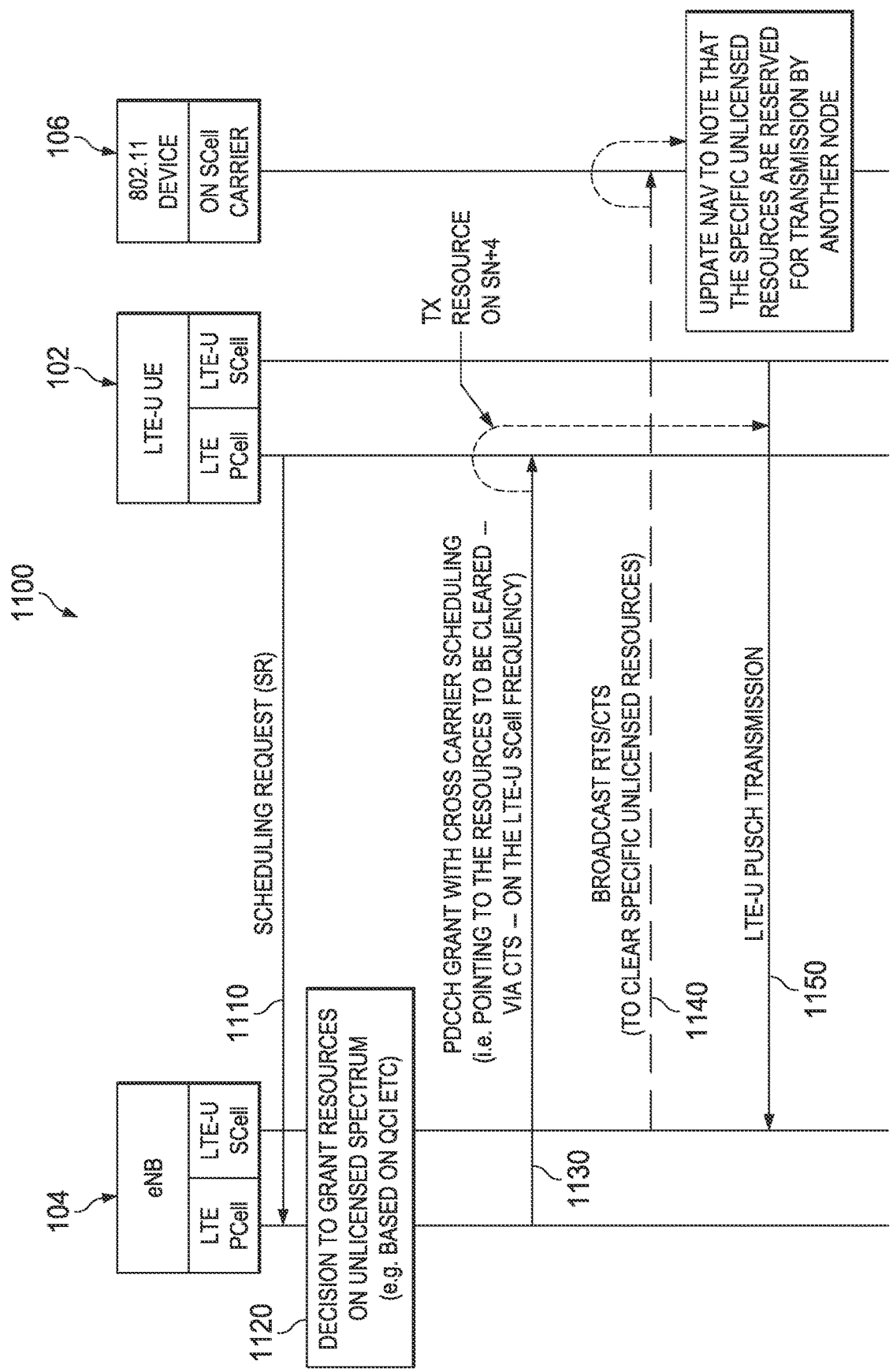
FIG. 11 is an example data flow diagram illustrating a channel clearing method by an eNB for UL transmission.

FIG. 11 is an example data flow diagram 1100 illustrating a channel clearing method by an eNB for UL transmission. In the illustrated example, the eNB 104 communicates with the LTE-U UE 102 on both the LTE PCell carrier and the LTE-U SCell carrier. The eNB 104 also sends RTS/CTS to the 802.11 device 106 on the LTE-U SCell carrier. At step 1110, the LTE-U UE 102 sends a Scheduling Request (SR) to the eNB 104 to request UL transmission. In some implementations, the SR may be transmitted on the LTE PCell carrier. Alternatively or in combination, the SR may be transmitted on the LTE-U SCell carrier. At step 1120, the eNB 104 determines to grant a set of UL resources on the LTE-U SCell carrier. At step 1130, the eNB 104 transmits an UL grant for PUSCH transmission of the LTE-U SCell carrier. The eNB 104 may transmit the UL grant on the LTE PCell carrier. In the illustrated example, the eNB 104 transmits the UL grant at subframe #SN to grant an UL transmission at subframe #SN+4. At step 1140, the eNB 104 broadcasts a CTS or an RTS message to the 802.11 device 106. As described previously, the CTS or RTS message may include a duration field indicating the specific number of subframes for the scheduled UL transmission. In some implementations, TTI bundling is not used and the specific number of subframes may be 1. Alternatively or in combination, TTI bundling is used and the specific number of subframes may be 4. Upon receiving the RTS/CTS message, the 802.11 device 106 may update the NAV to note that the LTE-U SCell carrier is reserved. Other devices operating in the LTE-U SCell carrier, e.g., any other LTE-U eNBs or Wi-Fi devices, may also read the RTS or the CTS and update the NAV. Clearing channels by eNB for UL transmission may have one or more advantages. For example, this approach pushes the implementation of the LBT scheme in the eNB and reduces the implementation complexities at the UE. At step 1150, the eNB 104 receives the PUSCH transmission on the LTE-U SCell carrier from the LTE-U UE 102.

Figure 12:
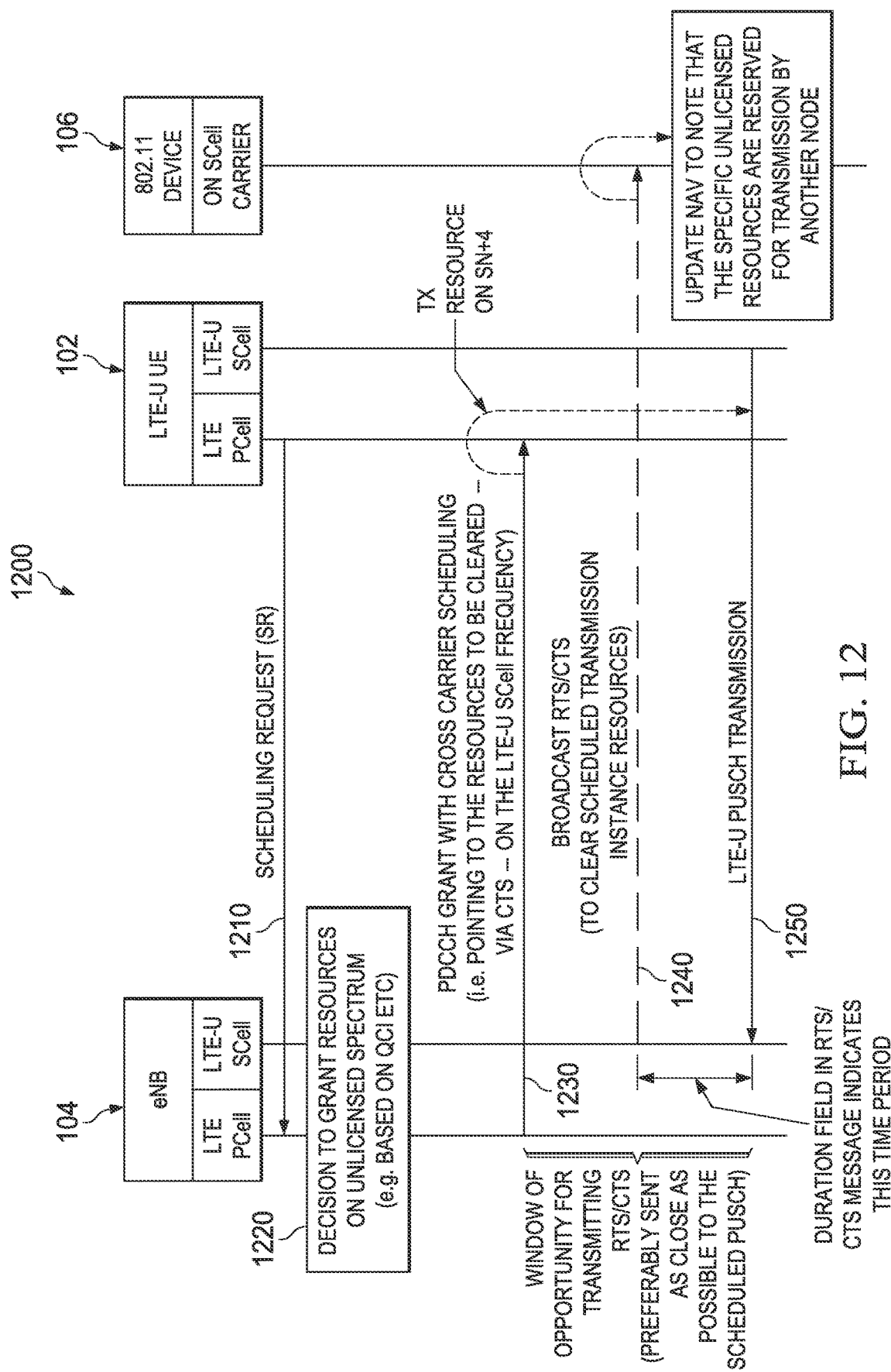
FIG. 12 is an example data flow diagram illustrating a timing relationship for clearing the channel on UL transmission by an eNB.

FIG. 12 is an example data flow diagram 1200 illustrating a timing relationship for clearing the channel on UL transmission by an eNB. In the illustrated example, the eNB 104 communicates with the LTE-U UE 102 on both the LTE PCell carrier and the LTE-U SCell carrier. The eNB 104 also sends RTS/CTS to the 802.11 device 106 on the LTE-U SCell carrier. At step 1210, the LTE-U UE 102 sends a Scheduling Request (SR) to the eNB 104 to request UL transmission. At step 1220, the eNB 104 determines to grant UL resource on the LTE-U SCell carrier. At step 1230, the eNB 104 transmits an UL grant for PUSCH transmission on the LTE-U SCell carrier. In the illustrated example, the eNB 104 transmits the UL grant at subframe #SN to grant an UL transmission at subframe #SN+4. In some implementations, the eNB 104 may schedule UL transmissions for more than one LTE-U UEs on the same UL subframe using frequency domain scheduling (resources as indicated on the PDCCH for each UE).

At step 1240, the eNB 104 broadcasts a CTS or an RTS message to the 802.11 device 106. As described previously, the eNB may send the RTS or CTS message close in time to the actual PUSCH transmission on the LTE-U SCell carrier. In some implementations, the RTS or CTS message may be addressed to a pseudo MAC address or to a MAC address associated with the eNB 104 itself. Other devices operating in the LTE-U SCell carrier, e.g., any other LTE-U eNBs or Wi-Fi devices, may also read the RTS or CTS and update the NAV. At step 1250, the eNB 104 receives the PUSCH transmission on the LTE-U SCell carrier from the LTE-U UE 102. Following is an example portion of 3GPP TS 36.212 specification that may support the channel clearing method described above.

5.3.3.1.1 Format 0

DCI format 0 is used for the scheduling of PUSCH in one UL cell.

The following information is transmitted by means of the DCI format 0:

Carrier indicator—0 or 3 bits.

When the carrier indicator corresponds to a carrier in unlicensed spectrum, the eNB shall monitor the availability of the carrier and transmit a CTS message prior to the occurrence of the scheduled PUSCH subframe on the carrier to ensure that this carrier is available for the transmission of the PUSCH codeword. The timing of the transmission of CTS is left to eNB implementation but the indicated duration in the CTS frame should occur close in time to the scheduled PUSCH frame and shall cover the period of the PUSCH transmission.

Figure 13:
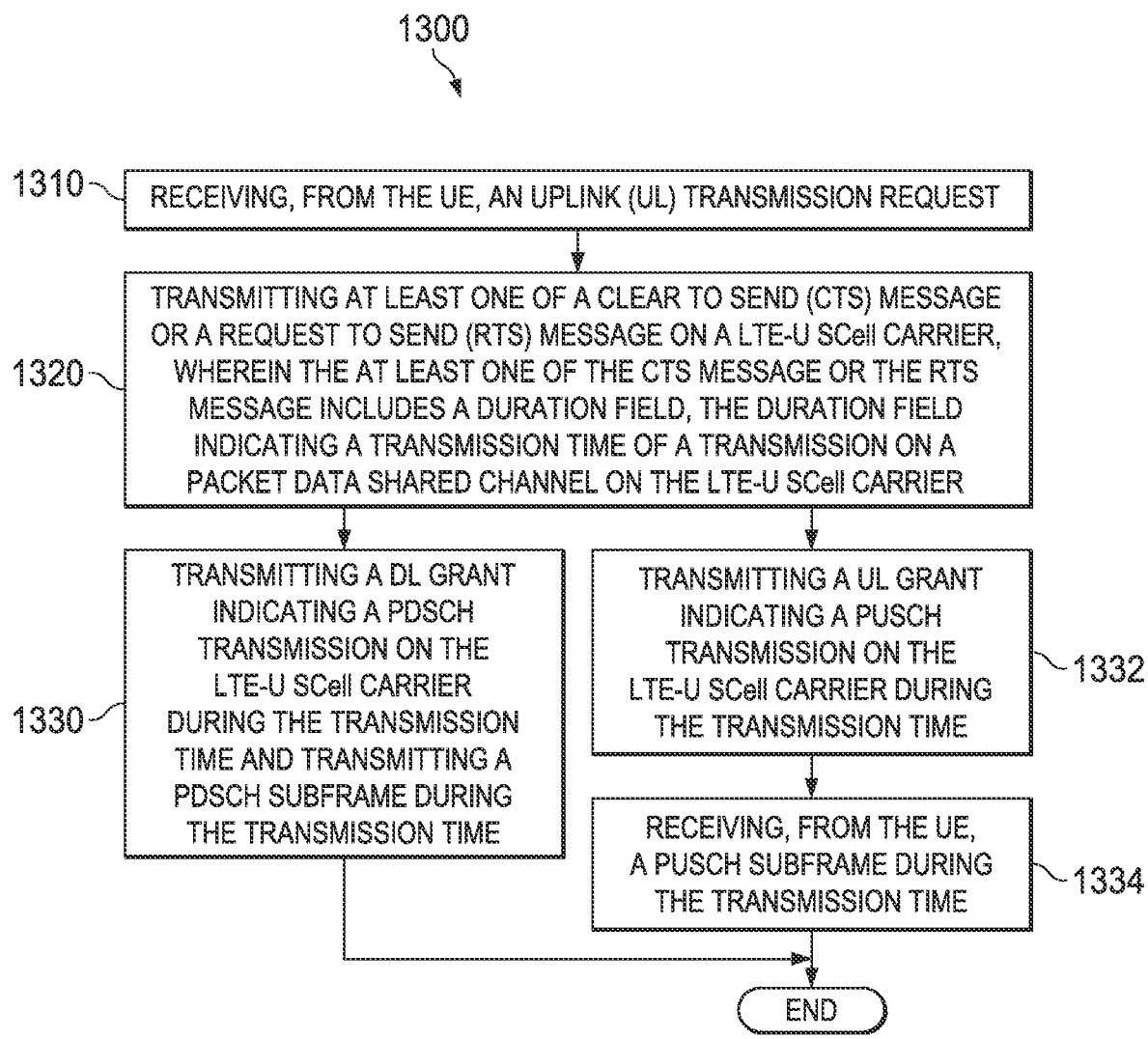
FIG. 13 is a flowchart illustrating a channel clearing method by an eNB.

FIG. 13 is a flowchart 1300 illustrating a channel clearing method by an eNB. The flowchart 1300 begins at step 1310, where an eNB receives an Uplink (UL) transmission request from a UE. In some instances, e.g., when a DL transmission is scheduled, step 1310 may be omitted. At step 1320, the eNB transmits at least one of a Clear to Send (CTS) message or a Request to Send (RTS) message on an LTE-U SCell carrier. The at least one of the CTS message or the RTS message includes a duration field. The duration field indicating a transmission time of a transmission on a packet data shared channel on the LTE-U SCell carrier. In some implementations, the transmission time indicated by the duration field is set from the time that the CTS message or the RTS message is received. For example, in such a case, the duration field may be set to 8 subframes, which indicates that the transmission time include the 8 subframes after the subframe that the CTS or RTS message is received. Alternatively or in combination, the duration field may be set from a predefined time relative to the time that the CTS message or the RTS message is received. In some implementations, the predefined time may be set by an eNB. For example, the eNB may set the predefined time to be 4 subframe. In such a case, if the duration field is set to 8 subframes, the transmission time may include the time from the $5^{th}$ subframe after the subframe that the CTS or RTS message is received to the $12^{th}$ subframe. The eNB may transmit a scheduling grant for the transmission on the packet data shared channel on the LTE-U SCell carrier during the transmission time. In some instances, at step 1330, the eNB transmits a DL scheduling grant, which indicates a Physical Downlink Shared Channel (PDSCH) transmission. The eNB also transmits a PDSCH subframe during the transmission time. In some instances, at step 1332, the eNB transmits an UL scheduling grant, which indicates a Physical Uplink Shared Channel (PUSCH) transmission by a UE. In such a case, at step 1334 the eNB receives a PUSCH subframe during the transmission time from the UE.

Figure 14:
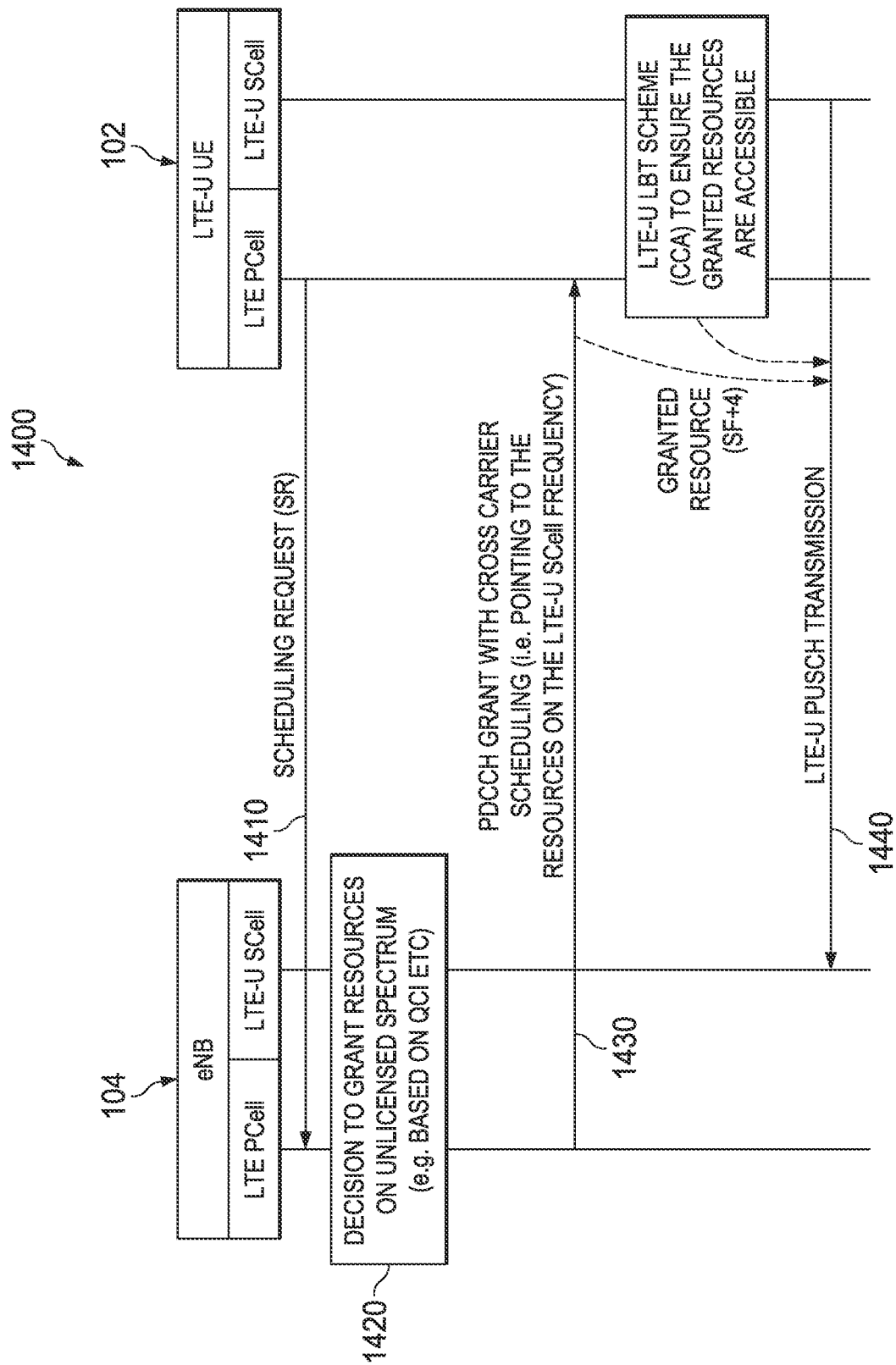
FIG. 14 is an example data flow diagram illustrating a channel assessment method by a UE for UL transmission.

FIG. 14 is an example data flow diagram 1400 illustrating a channel assessment method by a UE for UL transmission. In the illustrated example, the eNB 104 communicates with the LTE-U UE 102 on both the LTE PCell carrier and the LTE-U SCell carrier. At step 1410, the LTE-U UE 102 sends a Scheduling Request (SR) to the eNB 104 to request UL transmission. At step 1420, the eNB 104 determines to grant UL resource on the LTE-U SCell carrier. At step 1430, the eNB 104 transmits an UL grant for PUSCH transmission of the LTE-U SCell carrier. The eNB 104 may transmit the UL grant on the LTE PCell carrier. In the illustrated example, the eNB 104 transmits the UL grant at subframe #SF to grant an UL transmission at subframe #SF+4. In some implementations, the LTE-U UE 102 may perform CCA before accessing the LTE-U SCell on the granted subframe. The CCA may be based on the LBT scheme. In some implementations, the LBT module in the LTE-U UE 102 may measure the signal level on the LTE-U SCell carrier. If the measured signal level is higher than a threshold, then the LTE module determines that the LTE-U SCell carrier is busy. If the measured signal level is lower than a threshold, then the LTE module determines that the LTE-U SCell carrier is free. In some implementations, if the measured signal level is equal to a threshold, the LTE module may determine that the LTE-U SCell carrier is busy. Alternatively, if the measured signal level is equal to a threshold, the LTE module may determine that the LTE-U SCell carrier is free.

If the LBT scheme indicates that the LTE-U SCell carrier is busy, then the LTE-U UE 102 may refrain from transmitting on the LTE-U SCell carrier. In some implementations, the eNB 104 may treat the ignored grant as a missed uplink frame. In such a case, the eNB 104 may send a new grant to provide a retransmission opportunity for the missed PUSCH subframe. Alternatively or in combination, the eNB 104 may send a HARQ NACK on the LTE PCell carrier, which may trigger a non-adaptive retransmission, which may be transmitted without a scheduling grant. If the LBT scheme indicates that the LTE-U SCell carrier is free, then at step 1440, the LTE-U UE 102 may transmit on the PUSCH of the LTE-U SCell carrier during the subframe #SF+4. In some implementations, the LTE-U UE 102 may use LTE TTI bundling to transmit on the PUSCH for more than one subframes.

Figure 15:
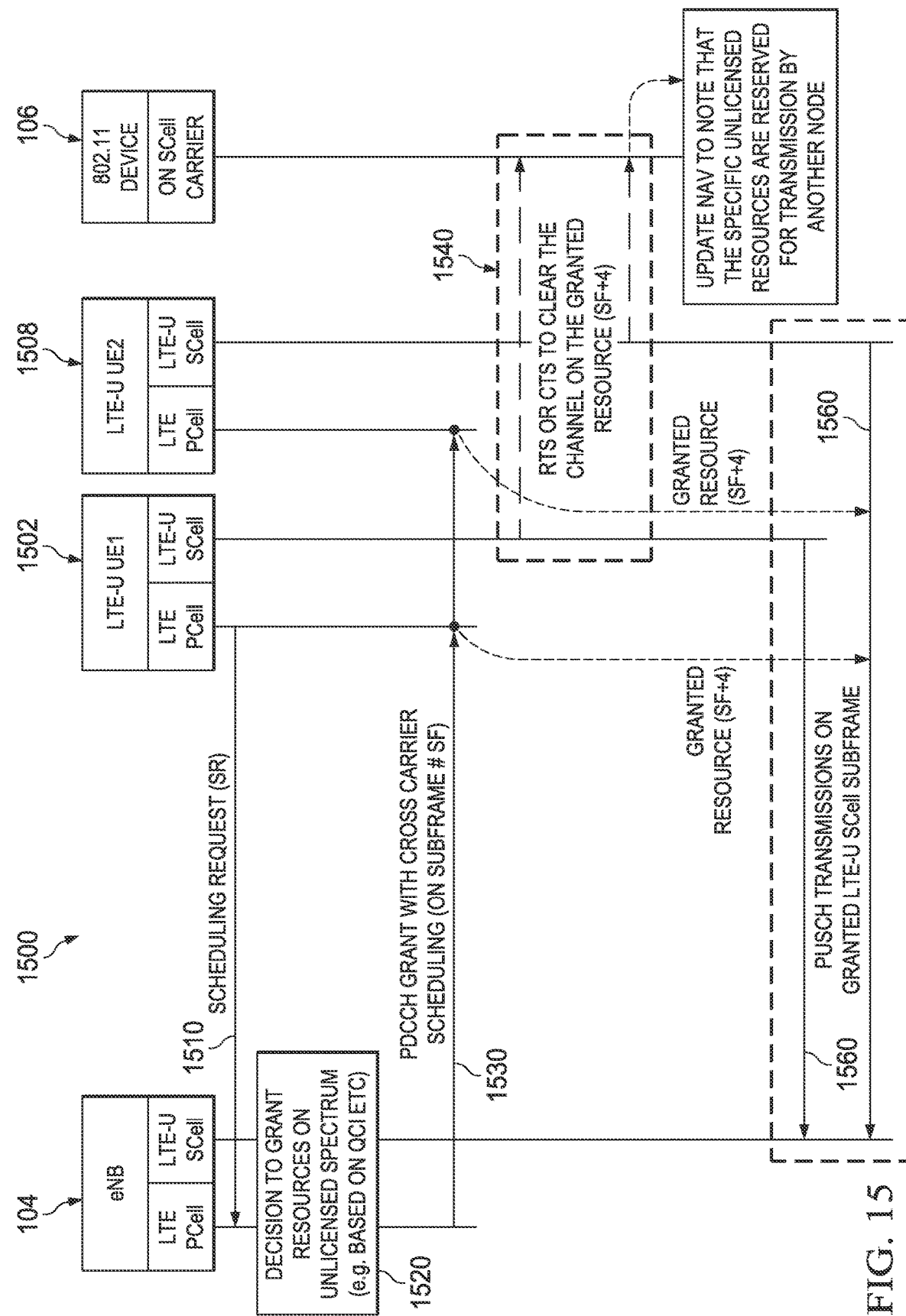
FIG. 15 is an example data flow diagram illustrating a channel clearing method by a UE for UL transmission.

FIG. 15 is an example data flow diagram 1500 illustrating a channel clearing method by a UE for UL transmission. In the illustrated example, the eNB 104 communicates with an LTE-U UE1 1502 and an LTE-U UE2 1508 on both the LTE PCell carrier and the LTE-U SCell carrier. The LTE-U UE1 1502 and the LTE-U UE2 1508 also send RTS/CTS to the 802.11 device 106 on the LTE-U SCell carrier. At step 1510, the LTE-U UE1 1502 sends a Scheduling Request (SR) to the eNB 104 to request UL transmission. At step 1520, the eNB 104 determines to grant a set of UL resources on the LTE-U SCell carrier to the LTE-U UE1 1502 and a different set of UL resources on the LTE-U SCell carrier to the LTE-U UE2 1508. At step 1530, the eNB 104 transmits an UL grant-1 to the LTE-U UE1 1502 and an UL grant-2 to the LTE-U UE2 1504. The eNB 104 may transmit both UL grants on the LTE PCell carrier. In the illustrated example, the eNB 104 transmits both UL grants at subframe #SF to grant UL resources at subframe #SF+4.

At step 1540, both the LTE-U UE1 1502 and the LTE-U UE2 1508 transmit an RTS message or a CTS message to other devices operating in the LTE-U SCell carrier, including the 802.11 device 106. Because the RTS or CTS message is used to clear other devices (e.g Wi-Fi devices and/or other eNBs) from the scheduled subframe, broadcasting the RTS or CTS message by more than one UEs may increase the chances that other devices may receive the message and refrain from transmitting. In some implementations, the LTE-U UE1 1502 and/or the LTE-U UE2 1508 may transmit the RTS or CTS message close in time to the actual UL transmission. In some implementations, the RTS or CTS message may be addressed to a pseudo MAC address or to a MAC address associated with the UE that transmits the RTS or CTS message. At step 1560, both the LTE-U UE1 1502 and the LTE-U UE2 1508 transmit UL at subframe #SF+4 using the UL resources assigned in their respective UL grants.

Figure 16:
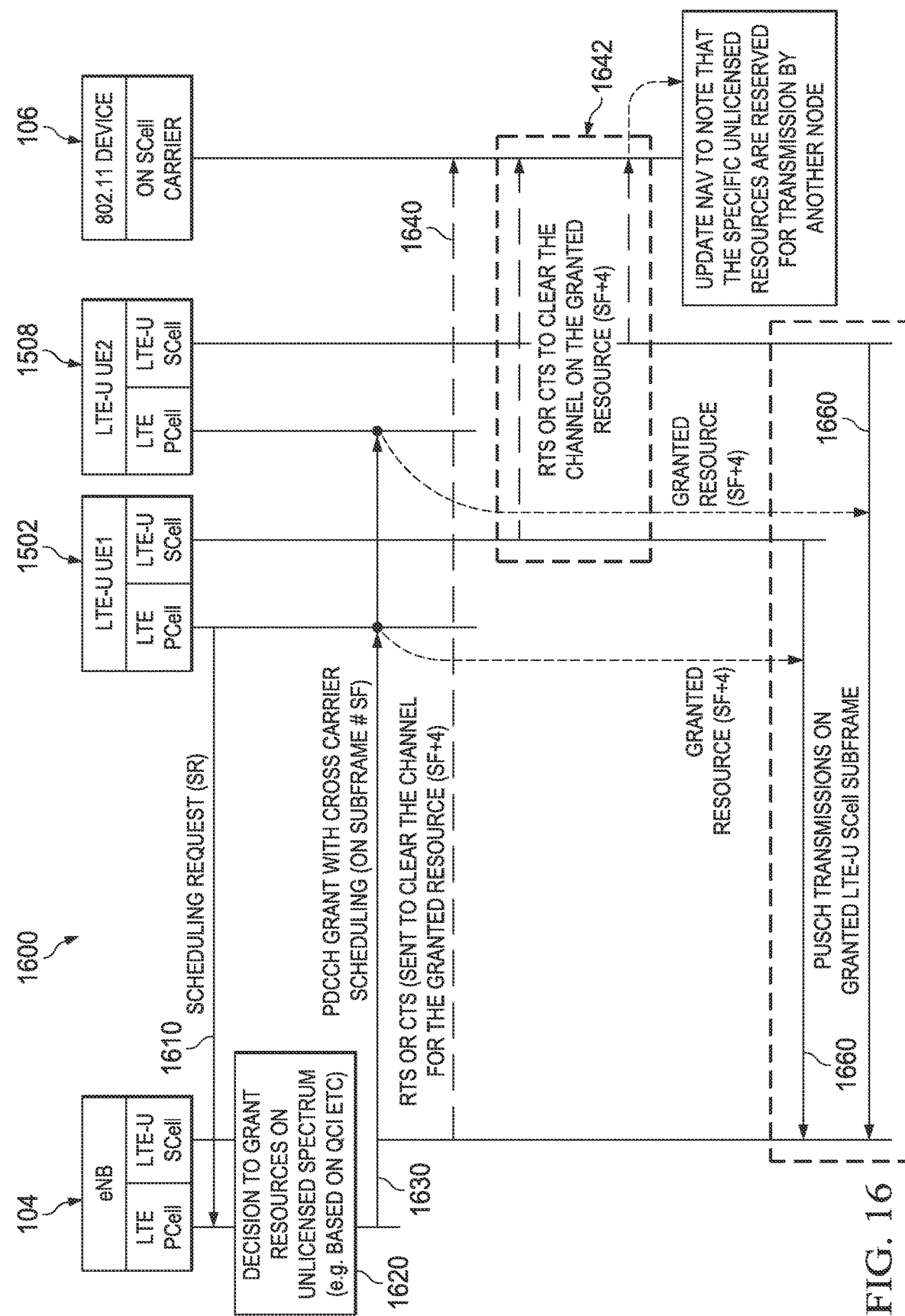
FIG. 16 is an example data flow diagram illustrating a channel clearing method by both a UE and an eNB for UL transmission.

FIG. 16 is an example data flow diagram 1600 illustrating a channel clearing method by both a UE and an eNB for UL transmission. In the illustrated example, the eNB 104 communicates with the LTE-U UE1 1502 and the LTE-U UE2 1508 on both the LTE PCell carrier and the LTE-U SCell carrier. The LTE-U UE1 1502, the LTE-U UE2 1508, and the eNB 104 also send RTS/CTS to the 802.11 device 106 on the LTE-U SCell carrier. At step 1610, the LTE-U UE1 1502 sends a Scheduling Request (SR) to the eNB 104 to request UL transmission. At step 1620, the eNB 104 determines to grant a set of UL resources on the LTE-U SCell carrier to the LTE-U UE1 1502 and a different set of UL resources on the LTE-U SCell carrier to the LTE-U UE2 1508. At step 1630, the eNB 104 transmits an UL grant-1 to the LTE-U UE1 1502 and an UL grant-2 to the LTE-U UE2 1504. The eNB 104 may transmit both UL grants on the LTE PCell carrier. In the illustrated example, the eNB 104 transmits both UL grants at subframe #SF to grant UL resources at subframe #SF+4.

At step 1640, the eNB 104 transmits an RTS or CTS message to other devices operating in the LTE-U SCell carrier, including the 802.11 device 106. At step 1642, both the LTE-U UE1 1502 and the LTE-U UE2 1508 transmit an RTS or CTS message to other devices operating in the LTE-U SCell carrier, including the 802.11 device 106. Transmitting CTS or RTS message by both the eNB and the UEs enhances the coverage of the channel clearing method. For example, this approach may help to clear channel for devices near either the eNB or the UEs. At step 1660, both the LTE-U UE1 1502 and the LTE-U UE2 1508 transmit UL data at subframe #SF+4 using the UL resources assigned in their respective UL grants. Following is an example portion of 3GPP TS 36.213 specification that may support the channel clearing method described above.

8.0 UE Procedure for Transmitting the Physical Uplink Shared Channel

The term "UL/DL configuration" in this subclause refers to the higher layer parameter subframeAssignment unless specified otherwise.

For FDD and normal HARQ operation, the UE shall upon detection on a given serving cell of a PDCCH/EPDCCH with DCI format 0/4 and/or a PHICH transmission in subframe n intended for the UE, adjust the corresponding PUSCH transmission in subframe n+4 according to the PDCCH/EPDCCH and PHICH information. If the PDCCH/EPDCCH refers to a cross-carrier scheduled subframe on an unlicensed carrier, the UE shall monitor the availability of the carrier and transmit a CTS message prior to the occurrence of the scheduled PUSCH subframe on the carrier to ensure that this carrier is available for the transmission of the PUSCH codeword. The timing of the transmission of the CTS is left to UE implementation but it should be transmitted close in time to the PUSCH transmission and the indicated duration in the CTS frame should cover the period of the scheduled PUSCH transmission as indicated in by the PDCCH/EPDCCH DCI format 0/4.

Figure 17:
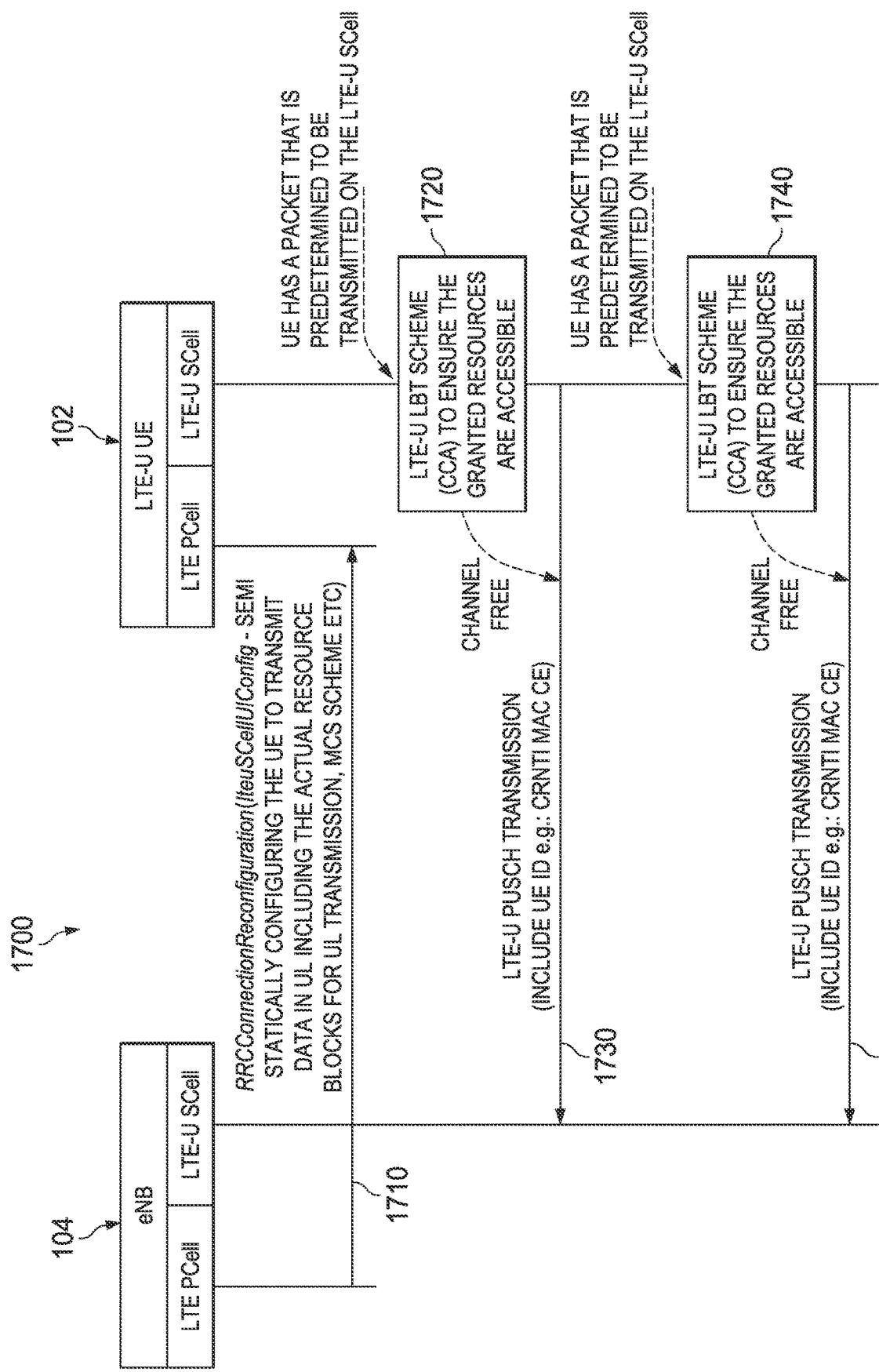
FIG. 17 is an example data flow diagram illustrating a channel assessment method by a UE for UL transmission based on a semi-static grant.

FIG. 17 is an example data flow diagram 1700 illustrating a channel assessment method by a UE for UL transmission based on a semi-static grant. In the illustrated example, the eNB 104 communicates with the LTE-U UE 102 on both the LTE PCell carrier and the LTE-U SCell carrier. At step 1710, the eNB 104 transmits a semi-static UL grant. The semi-static UL grant may grant a permission to transmit on the UL of the LTE-U SCell carrier during one or more predetermined subframes. The eNB 104 may also preconfigure the semi-static frequency domain resources (resource blocks) for different UEs at the predetermined subframes to minimize the collisions. At step 1720, the UE may determine to transmit an UL packet at a first predetermined subframe. Before transmitting, the LTE-U UE 102 may perform CCA based on the LBT scheme to determine whether the LTE-U SCell carrier is busy. At step 1730, if the LTE-U SCell carrier is free, the LTE-U UE 102 transmits on the PUSCH of the LTE-U SCell carrier. In some implementations, the LTE-U UE 102 may include a UE identifier (e.g. it's CRNTI) in the transmitted subframe. For example, the PUSCH data frame may include a CRNTI MAC CE. If the LTE-U SCell carrier is busy, the LTE-U UE 102 may refrain from transmitting at the first predetermined subframe. Alternatively or in combination, the LTE-U UE 102 may transmit a CTS or an RTS message to clear the channel before the transmitting on the first predetermined subframe.

At step 1740, the LTE-U UE 102 may determine to transmit another UL packet at a second predetermined subframe. Before transmitting, the LTE-U UE 102 may perform CCA based on the LBT scheme to determine whether the LTE-U SCell carrier is busy. At step 1750, if the LTE-U SCell carrier is free, the LTE-U UE 102 transmits on the PUSCH of the LTE-U SCell carrier. If the LTE-U SCell carrier is busy, the LTE-U UE 102 may refrain from transmitting at the second predetermined subframe. Alternatively or in combination, the LTE-U UE 102 may transmit a CTS or an RTS message to clear the channel before the transmitting on the second predetermined subframe. Scheduling transmission on the LTE-U SCell carrier using semi-static grant described above may have one or more advantages. For example, this approach may reduce overhead of resource requests and grants. This approach may also reduce latency and increase performance for delay sensitive services, which may be indicated by the QCI of the associated data traffic.

In some implementations, an RRC Information Element (IE) may be used to configure semi-static transmissions as described above. The RRC IE may be included in an RRCConnectionReconfiguration message transmitted from the eNB 104 to the LTE-U UE 102. Following is a definition of an IE, lteuSCellUIConfig, which may provide an example of the structure and contents of the IE.

```
-- ASN1START
lteuSCellUIConfig ::=    SEQUENCE {
    lteu-RIV            CHOICE {
        b5              INTEGER (0..31),
        b6              INTEGER (0..63),
        b7              INTEGER (0..127),
        b8              INTEGER (0..255),
        b9              INTEGER (0..511),
        b10             INTEGER (0..1023),
        b11             INTEGER (0..2047),
        b12             INTEGER (0..4095),
        b13             INTEGER (0..8191)
    },                                      OPTIONAL - Need
                                            ON
    lteu-MCS            INTEGER (0..31),    OPTIONAL - Need
                                            ON
    lteu-DMRSshift      INTEGER (0..7),     OPTIONAL - Need
                                            ON
    }
}
-- ASN1STOP
```

| CSR-PUSCH-Config field descriptions |
|---|
| Iteu-RIV |
| Resource Indication Value for transmissions on LTE-U SCell in UL. Specifies both the number of consecutive virtual resource blocks reserved for PUSCH transmissions and the starting virtual resource block for the resource (see section 8.1 of TS 36.213). The number of RIVs is a function of the number of UL resource blocks ($N_{RB}^{UL}$) within the system bandwidth and is equal to $N_{RIV} = \text{ceil}((N_{RB}^{UL}))*(N_{RB}^{UL} + 1)/2)$. Choice parameters b5, b6, . . . b13 correspond to $\log2(N_{RIV})$. |
| Iteu-MCS |
| MCS indication field defining both the transport block size and the modulation order to be used on the Iteu resource. Corresponds to parameter $I_{MCS}$ of section 8.6.1 of 36.213. The eNB may send a new IteuSCellUIConfig to change the MCS to be used by the UE. |
| Iteu-DMRSshift |
| Cyclic shift for demodulation reference signals. Corresponds to the cyclic shift field in table 5.5.2.1.1-1 of TS 36.211. |

Figure 18:
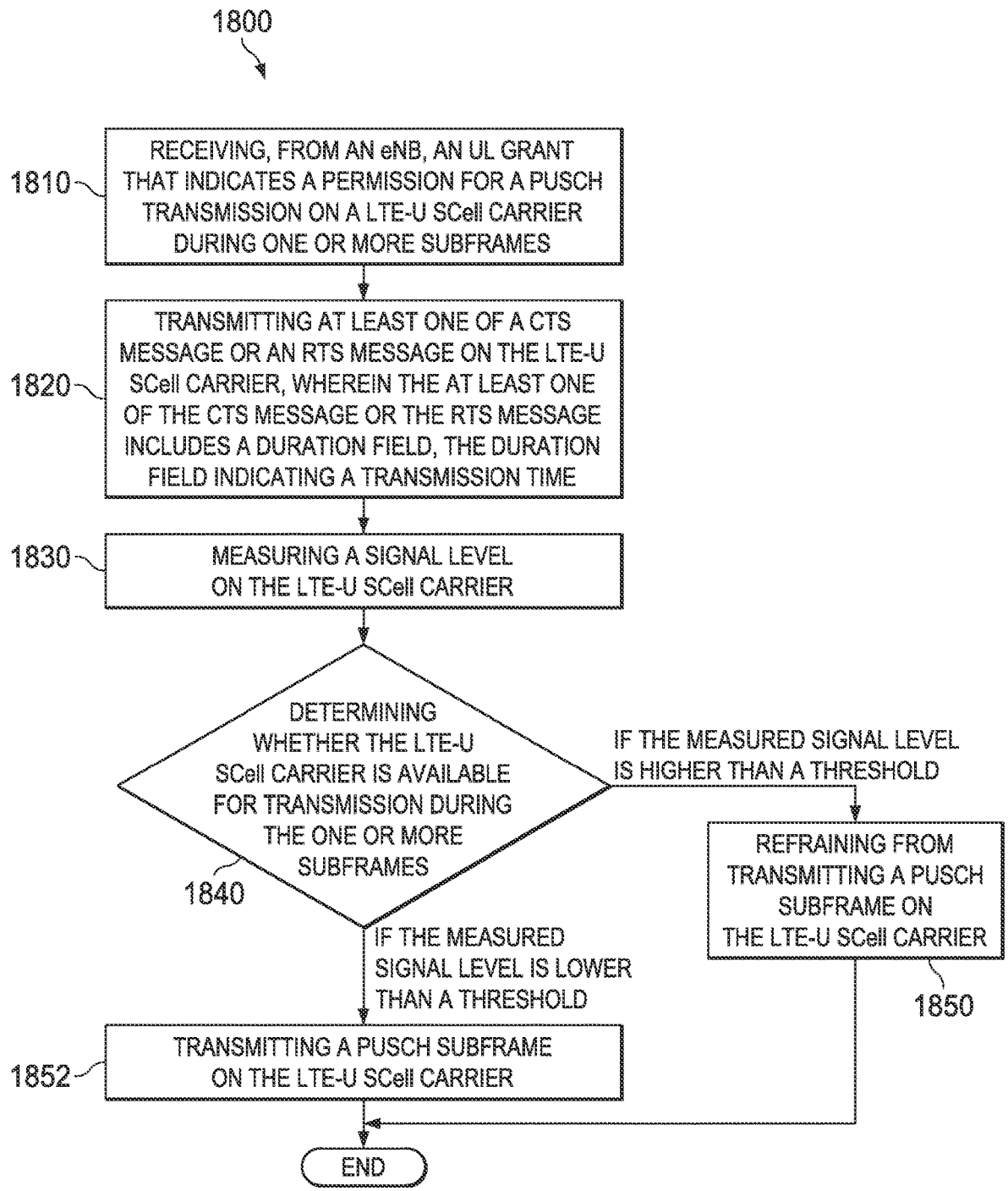
FIG. 18 is a flowchart illustrating a channel assessment method by a UE.

FIG. 18 is a flowchart 1800 illustrating a channel assessment method by a UE. The flowchart 1800 begins at step 1810, where a UE receives, from an eNB, an UL grant that indicates a permission for a PUSCH transmission on an LTE-U SCell carrier during one or more subframes. In some implementations, the UL grant may be received on a Physical Downlink Control Channel (PDCCH). In some implementations, the UL grant is received on a Long Term Evolution (LTE) Primary Cell (PCell) carrier. In some implementations, the UL grant is a semi-static UL grant configured using an RRC message. In some implementations, at step 1820, the UE transmits at least one of a CTS message or an RTS message on the LTE-U SCell carrier, wherein the at least one of the CTS message or the RTS message includes a duration field, the duration field indicating a transmission time.

At step 1830, the UE measures a signal level on the LTE-U SCell carrier. At step 1840, the UE determines whether the LTE-U SCell carrier is available for transmission during the one or more subframes. In some implementations, the UE determines whether the LTE-U SCell carrier is available for transmission based on the measured signal level. If the measured signal level is higher than a threshold, at step 1850, the UE determines that the LTE-U SCell carrier is not available for transmission and refrains from transmitting on the LTE-U SCell carrier. If the measured signal level is lower than a threshold, at step 1852, the UE determines that the LTE-U SCell carrier is available for transmission and transmits a PUSCH subframe on the LTE-U SCell carrier. In some implementations, if the measured signal level is equal to a threshold, the LTE module may determine that the LTE-U SCell carrier is busy. Alternatively, if the measured signal level is equal to a threshold, the LTE module may determine that the LTE-U SCell carrier is free. In some implementations, the UE uses LTE Transmission Time Interval (TTI) bundling when transmitting more than one subframes consecutively according to the configuration by the eNB.

Figure 19:
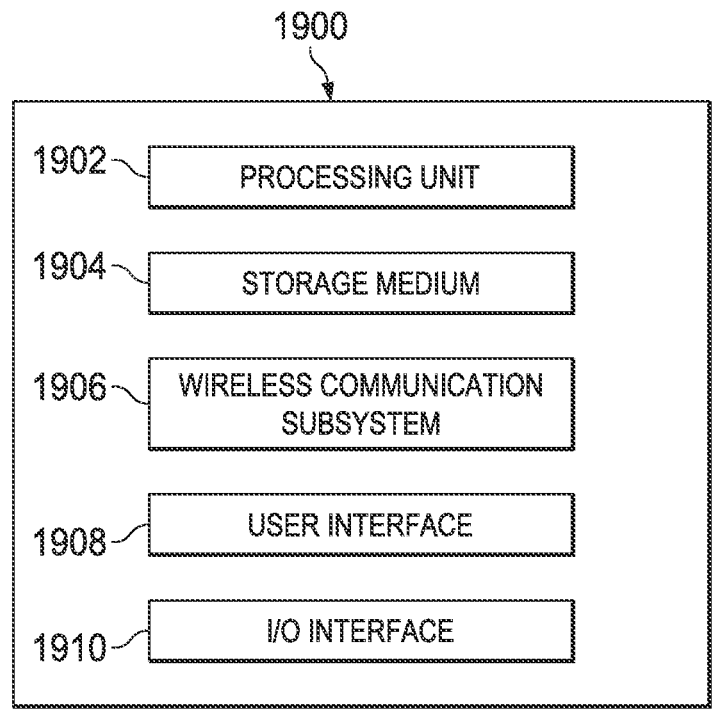
FIG. 19 is a schematic block diagram illustrating an example user equipment device.

FIG. 19 is a schematic block diagram 1900 illustrating an example user equipment device. The illustrated device 1900 includes a processing unit 1902, a computer readable storage medium 1904 (for example, ROM or flash memory), a wireless communication subsystem 1906, a user interface 1908, and an I/O interface 1910.

The processing unit 1902 can include one or more processing components (alternatively referred to as "processors" or "central processing units" (CPUs)) configured to execute instructions related to one or more of the processes, steps, or actions described above in connection with one or more of the implementations disclosed herein. In some implementations, the processing module 1902 may be configured to generate control information, such as a measurement report, or respond to received information, such as control information from a network node. The processing module 1902 may also be configured to make a RRM decision such as cell selection/reselection information or triggering a measurement report. The processing unit 1902 can also include other auxiliary components, such as random access memory (RAM) and read only memory (ROM). The computer readable storage medium 1904 can store an operating system (OS) of the device 1900 and various other computer executable software programs for performing one or more of the processes, steps, or actions described above.

The wireless communication subsystem 1906 may be configured to provide wireless communication for data and/or control information provided by the processing unit 1902. The wireless communication subsystem 1906 can include, for example, one or more antennas, a receiver, a transmitter, a local oscillator, a mixer, and a digital signal processing (DSP) unit. In some implementations, the subsystem 1906 can support multiple input multiple output (MIMO) transmissions. In some implementations, the receivers in the wireless communication subsystems 1906 can be an advance receiver or a baseline receiver. Two receivers can be implemented with identical, similar, or different receiver processing algorithms.

The user interface 1908 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 1910 can include, for example, a universal serial bus (USB) interface. Various other components can also be included in the device 1900.

Figure 20:
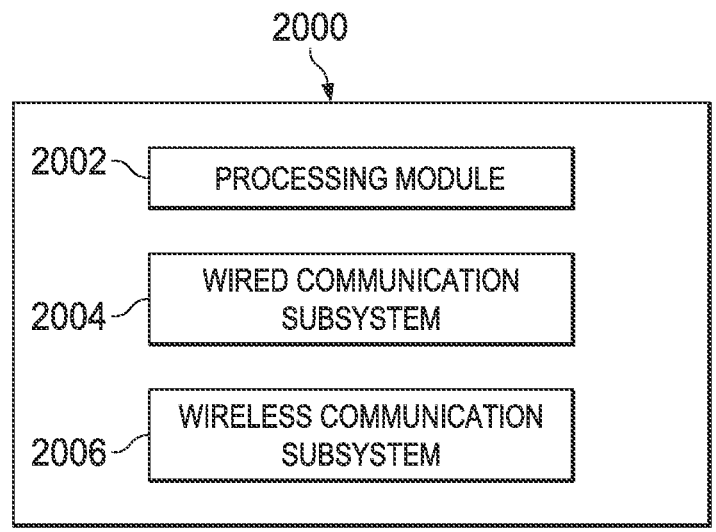
FIG. 20 is a schematic block diagram illustrating an example base station.

FIG. 20 is a schematic block diagram 2000 illustrating an example base station. The illustrated device 2000 includes a processing module 2002, a wired communication subsystem 2004, and a wireless communication subsystem 2006. The wireless communication subsystem 2006 can receive data traffic and control traffic from the UE. In some implementations, the wireless communication subsystem 2006 may include a receiver and a transmitter. The wired communication subsystem 2004 can be configured to transmit and receive control information between other access node devices via backhaul connections. The processing module 2002 can include one or more processing components (alternatively referred to as "processors" or "central processing units" (CPUs)) capable of executing instructions related to one or more of the processes, steps, or actions described above in connection with one or more of the implementations disclosed herein. The processing module 2002 can also include other auxiliary components, such as random access memory (RAM), read only memory (ROM), secondary storage (for example, a hard disk drive or flash memory). The processing module 2002 can form at least part of the layers described above in connection with FIG. 2. In some implementations, the processing module 2002 may be configured to generate control information or respond to received information such as a measurement report transmitted from a UE. The processing module 2002 may also be configured to make a RRM decision based at least in part on the information transmitted from the UE, such as cell selection/reselection information or the measurement report. The processing module 2002 can execute certain instructions and commands to provide wireless or wired communication, using the wired communication subsystem 2004 or a wireless communication subsystem 2006. Various other components can also be included in the device 2000.

A number of embodiments of the invention have been described. Nevertheless, it will be understood that various modifications may be made without departing from the spirit and scope of the invention. Accordingly, other embodiments are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing form the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps are not implied by the order they appear in the claims.

What is claimed is:

1. A method, comprising:
   receiving, at an evolved Node B (eNB), a long term evolution (LTE) Scheduling Request (SR) transmitted from a User Equipment (UE) on a long term evolution (LTE) in Unlicensed (LTE-U) secondary cell (SCell) carrier;
   in response to receiving the LTE SR at the eNB, determining, at the eNB, to grant resources on the LTE-U SCell carrier for an uplink transmission, wherein the determininq to grant resources on the LTE-U SCell carrier comprises measuring a signal level lower than a threshold;
   transmitting, from the eNB, at least one of a Clear to Send (CTS) message or a Request to Send (RTS) message on the LTE-U SCell carrier, wherein the at least one of the CTS message or the RTS message includes a duration field, the duration field indicating a time period until an end of a scheduled transmission time, and wherein the at least one of the CTS message or the RTS message is addressed to a Medium Access Control (MAC) address or a pseudo MAC address associated with the evolved Node B (eNB); and
   in response to transmitting the at least one of the CTS message or the RTS message, transmitting, from the eNB and on an LTE primary cell (PCell) carrier, a scheduling grant for a transmission on the LTE-U SCell carrier, wherein the LTE PCell carrier is in a licensed frequency spectrum.

2. The method of claim 1, wherein the scheduling grant indicates a Physical Uplink Shared Channel (PUSCH) transmission, further comprising:
   receiving, from the UE, a PUSCH subframe during the scheduled transmission time.

3. A method, comprising:
   receiving, from an eNB and on a long term evolution (LTE) primary cell (PCell) carrier, an UL grant that indicates a permission for a PUSCH transmission on an LTE in Unlicensed (LTE-U) secondary cell (SCell) carrier during one or more subframes, wherein the LTE PCell carrier is in a licensed frequency spectrum;
   determining, at a User Equipment (UE), that the LTE-U SCell carrier is available for transmission during the one or more subframes wherein the determining that the LTE-U SCell carrier is available for transmission during the one or more subframes comprises measuring a signal level lower than a threshold; and
   in response to determining at the UE that the LTE-U SCell carrier is available for transmission:
      transmitting, from the UE, a CTS message on the LTE-U SCell carrier independent of receiving an RTS, wherein the CTS message includes a duration field, the duration field indicating a time period until an end of the one or more subframes, and the CTS message includes a Medium Access Control (MAC) address or a pseudo MAC address associated with the UE; and
      transmitting a PUSCH subframe on the LTE-U SCell carrier during the time period indicated by the duration field.

4. The method of claim 3, wherein the UL grant is received on a Physical Downlink Control Channel (PDCCH).

5. The method of claim 3, wherein the UL grant is a semi-static UL grant received in an RRC message.

6. The method of claim 3, wherein LTE Transmission Time Interval (TTI) bundling is used when transmitting more than one subframes.

7. A base station, comprising:
   a memory; and
   one or more processors communicatively coupled with the memory and configured to:
      receive a long term evolution (LTE) Scheduling Request (SR) transmitted from a User Equipment (UE) on a long term evolution (LTE) in Unlicensed (LTE-U) secondary cell (SCell) carrier;
      in response to receiving the LTE SR, determine to grant resources on the LTE-U SCell carrier for an uplink transmission, wherein the determination to qrant resources on the LTE-U SCell carrier comprises measuring a signal level lower than a threshold;
      transmit at least one of a Clear to Send (CTS) message or a Request to Send (RTS) message on the LTE-U SCell carrier, wherein the at least one of the CTS message or the RTS message includes a duration field, the duration field indicating a time period until an end of a scheduled transmission time, and wherein the at least one of the CTS message or the RTS message is addressed to a Medium Access Control (MAC) address or a pseudo MAC address associated with an evolved Node B (eNB); and in response to transmitting the at least one of the CTS message or the RTS message, transmit, from the base station and on an LTE primary cell (PCell) carrier, a scheduling grant for a transmission on the LTE-U SCell carrier, wherein the LTE PCell carrier is in a licensed frequency spectrum.

8. The base station of claim 7, wherein the scheduling grant indicates a Physical Uplink Shared Channel (PUSCH) transmission, and the one or more processors are further configured to:

receive, from the UE, a PUSCH subframe during the scheduled transmission time.

9. A user equipment (UE), comprising:
a memory; and
one or more processors communicatively coupled with the memory and configured to:
receive, from an eNB and on a long term evolution (LTE) primary cell (PCell) carrier, an UL grant that indicates a permission for a PUSCH transmission on an LTE in Unlicensed (LTE-U) secondary cell (SCell) carrier during one or more subframes, wherein the LTE PCell carrier is in a licensed frequency spectrum;

determine, at the UE, that the LTE-U SCell carrier is available for transmission during the one or more subframes, wherein the determination that the LTE-U SCell carrier is available for transmission during the one or more subframes comprises measuring a signal level lower than a threshold; and in response to determining at the UE that the LTE-U SCell carrier is available for transmission:

transmit from the UE, a CTS message on the LTE-U SCell carrier independent of receiving an RTS, wherein the CTS message includes a duration field, the duration field indicating a time period until an end of the one or more subframes, and the CTS message includes a Medium Access Control (MAC) address or a pseudo MAC address associated with the UE; and transmit a PUSCH subframe on the LTE-U SCell carrier during the time period indicated by the duration field.

10. The UE of claim 9, wherein the UL grant is received on a Physical Downlink Control Channel (PDCCH).

11. The UE of claim 9, wherein the UL grant is a semi-static UL grant received in an RRC message.

12. The UE of claim 9, wherein LTE Transmission Time Interval (TTI) bundling is used when transmitting more than one subframes.

* * * * *

UNITED STATES PATENT AND TRADEMARK OFFICE
CERTIFICATE OF CORRECTION

PATENT NO.        : 10,560,891 B2
APPLICATION NO.   : 14/481808
DATED             : February 11, 2020
INVENTOR(S)       : Eswar Vutukuri et al.

Page 1 of 1

It is certified that error appears in the above-identified patent and that said Letters Patent is hereby corrected as shown below:

In the Claims

In Column 21, Line 58, delete "determininq" and insert -- determining --, therefor.

In Column 22, Line 24, after "subframes" insert -- , --.

In Column 22, Line 59, delete "qrant" and insert -- grant --, therefor.

Signed and Sealed this
Fifth Day of May, 2020

Andrei Iancu
*Director of the United States Patent and Trademark Office*